US010023393B2

(12) United States Patent
Brazeau et al.

(10) Patent No.: US 10,023,393 B2
(45) Date of Patent: Jul. 17, 2018

(54) ROBOTIC TOSSING OF ITEMS IN INVENTORY SYSTEM

(71) Applicant: Amazon Technologies, Inc., Seattle, WA (US)

(72) Inventors: Jeremiah David Brazeau, Hudson, NH (US); Andrew M. Sweeney, Franklin, MA (US); Henry David Garcia, Marlborough, MA (US); Fred Chen, Westborough, MA (US); Brian Michael Lusignan, Shrewsbury, MA (US)

(73) Assignee: Amazon Technologies, Inc., Seattle, WA (US)

( * ) Notice: Subject to any disclaimer, the term of this patent is extended or adjusted under 35 U.S.C. 154(b) by 338 days.

(21) Appl. No.: 14/869,450

(22) Filed: Sep. 29, 2015

(65) Prior Publication Data
US 2017/0088360 A1    Mar. 30, 2017

(51) Int. Cl.
*G06F 7/00* (2006.01)
*G06F 19/00* (2018.01)
*B65G 31/00* (2006.01)
*B25J 9/12* (2006.01)
*B25J 9/16* (2006.01)
*G06Q 10/08* (2012.01)
*B65G 1/137* (2006.01)
*G05B 19/418* (2006.01)

(52) U.S. Cl.
CPC ............ *B65G 31/00* (2013.01); *B25J 9/12* (2013.01); *B25J 9/1664* (2013.01); *B65G 1/1375* (2013.01); *G05B 19/41895* (2013.01); *G06Q 10/087* (2013.01); *G05D 2201/0216* (2013.01); *Y10S 901/02* (2013.01)

(58) Field of Classification Search
None
See application file for complete search history.

(56) References Cited

U.S. PATENT DOCUMENTS 7,854,669 B2 * 12/2010 Marty ................ A63B 24/0021
                                                473/448
8,280,547 B2    10/2012 D'Andrea et al.
9,087,314 B2     7/2015 Hoffman et al.
(Continued)

OTHER PUBLICATIONS

Frank et al. "Throwing Objects a bio-inspired Approach for the Transportation of Parts", *Robotics and Biomimetics*. ROBIO '06 IEEE International Conference. (Dec. 1, 2006), pp. 91-96.
(Continued)

*Primary Examiner* — Yolanda R Cumbess
(74) *Attorney, Agent, or Firm* — Kilpatrick Townsend & Stockton LLP

(57) ABSTRACT

Robotic arms or manipulators can be used to toss inventory items within an inventory system. Tossing strategies for the robotic arms may include information about how a grasped item is to be moved and released by a robotic arm to achieve a trajectory for moving the item to a receiving location. A tossing strategy may also use a trajectory that avoids time and/or space reserved for a trajectory of another tossed item. The receiving location can include surfaces and/or other features that can be manipulated for receiving the item based on one or more characteristics of the tossed item and/or a trajectory of the tossed item.

20 Claims, 9 Drawing Sheets

(56) References Cited

U.S. PATENT DOCUMENTS 9,440,353 B1\* 9/2016 da Silva ................. B25J 9/1605
2016/0250536 A1\* 9/2016 Hart ....................... A63B 69/40
124/7

OTHER PUBLICATIONS

Frank et al., "Throwing or shooting—a new technology for logistic chains within production systems", *Technologies for Practical Robot Applications*, TePRA 2008 IEEE International Conference (Nov. 10, 2008), pp. 62-67.
PCT/US2016/054503, "International Search Report and Written Opinion", dated Nov. 29, 2016, 12 pages.
U.S. Appl. No. 14/572,420, filed Dec. 16, 2014, titled "Generating Robotic Grasping Instructions for Inventory Items" (unpublished).
U.S. Appl. No. 14/572,332, filed Dec. 16, 2014, titled "Robotic Grasping of Items in Inventory System" (unpublished).

\* cited by examiner

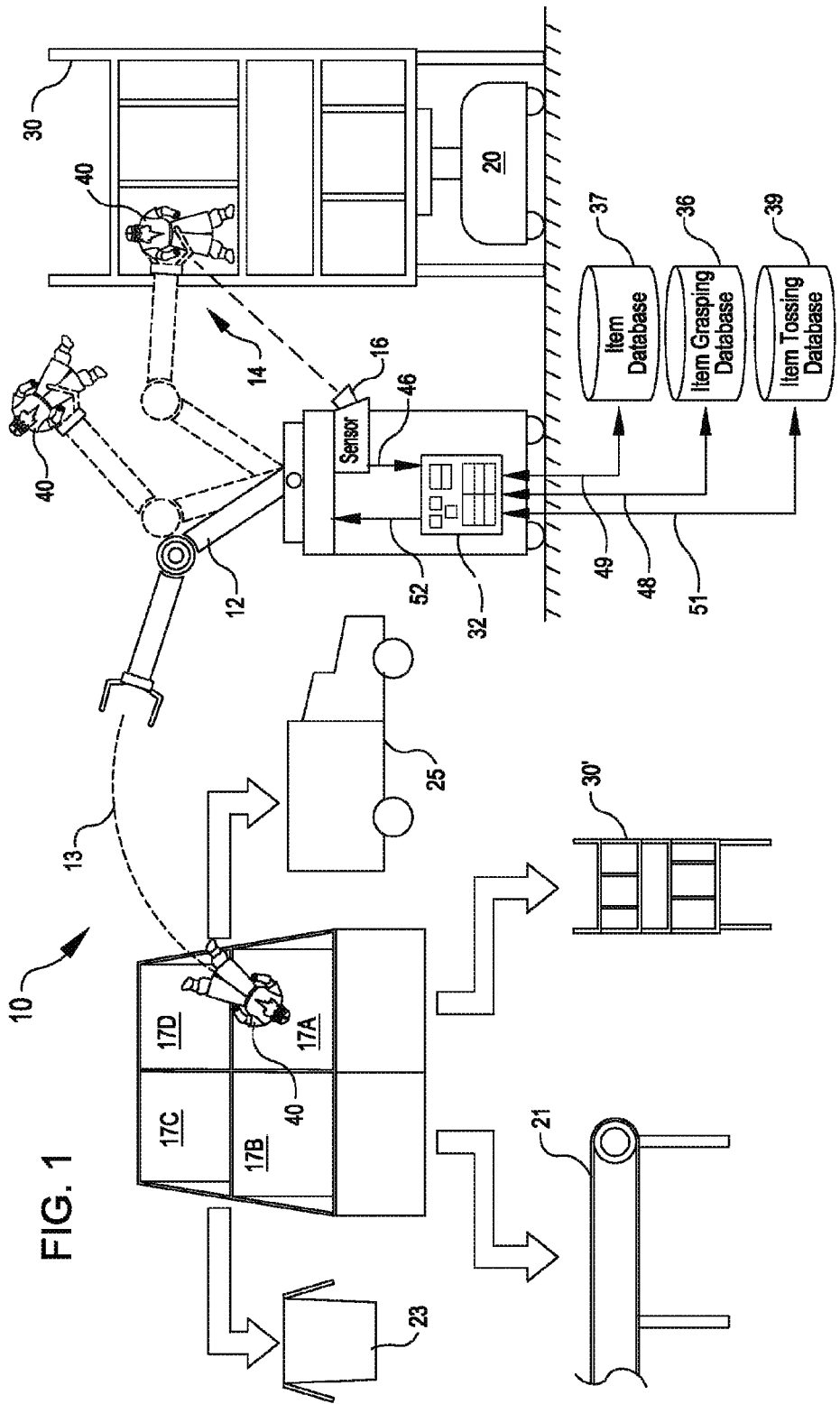

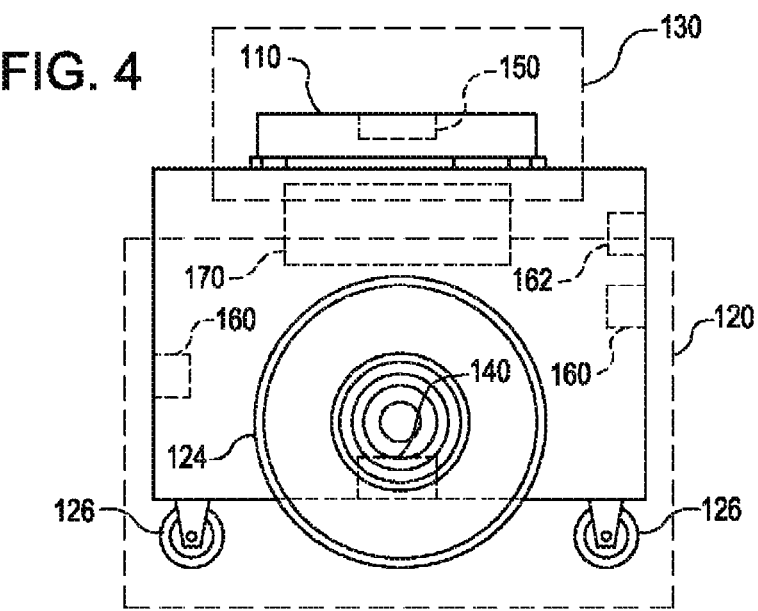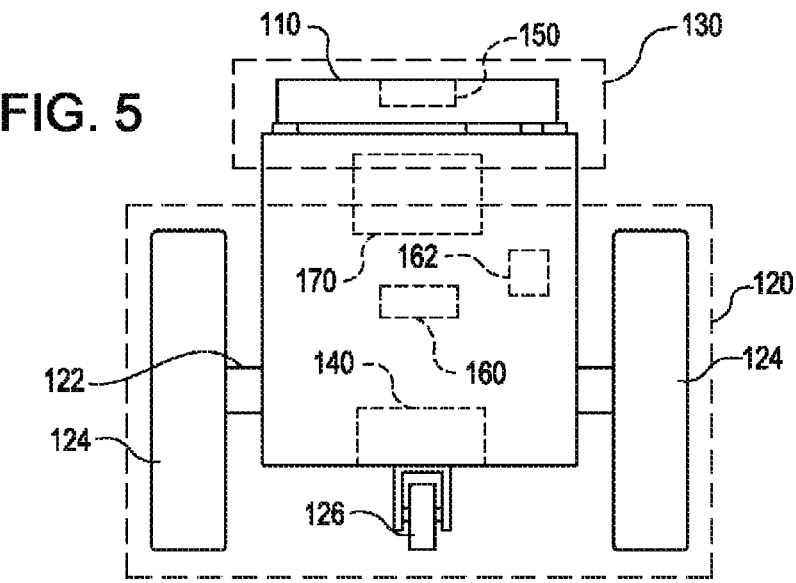

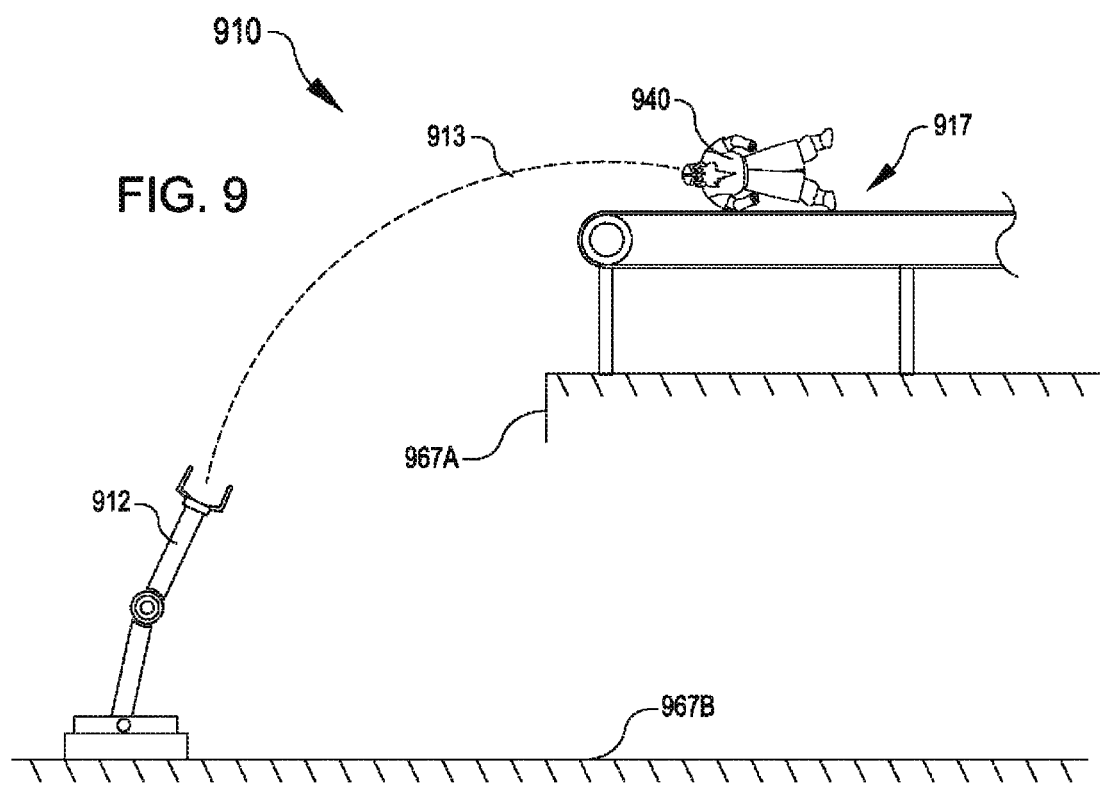

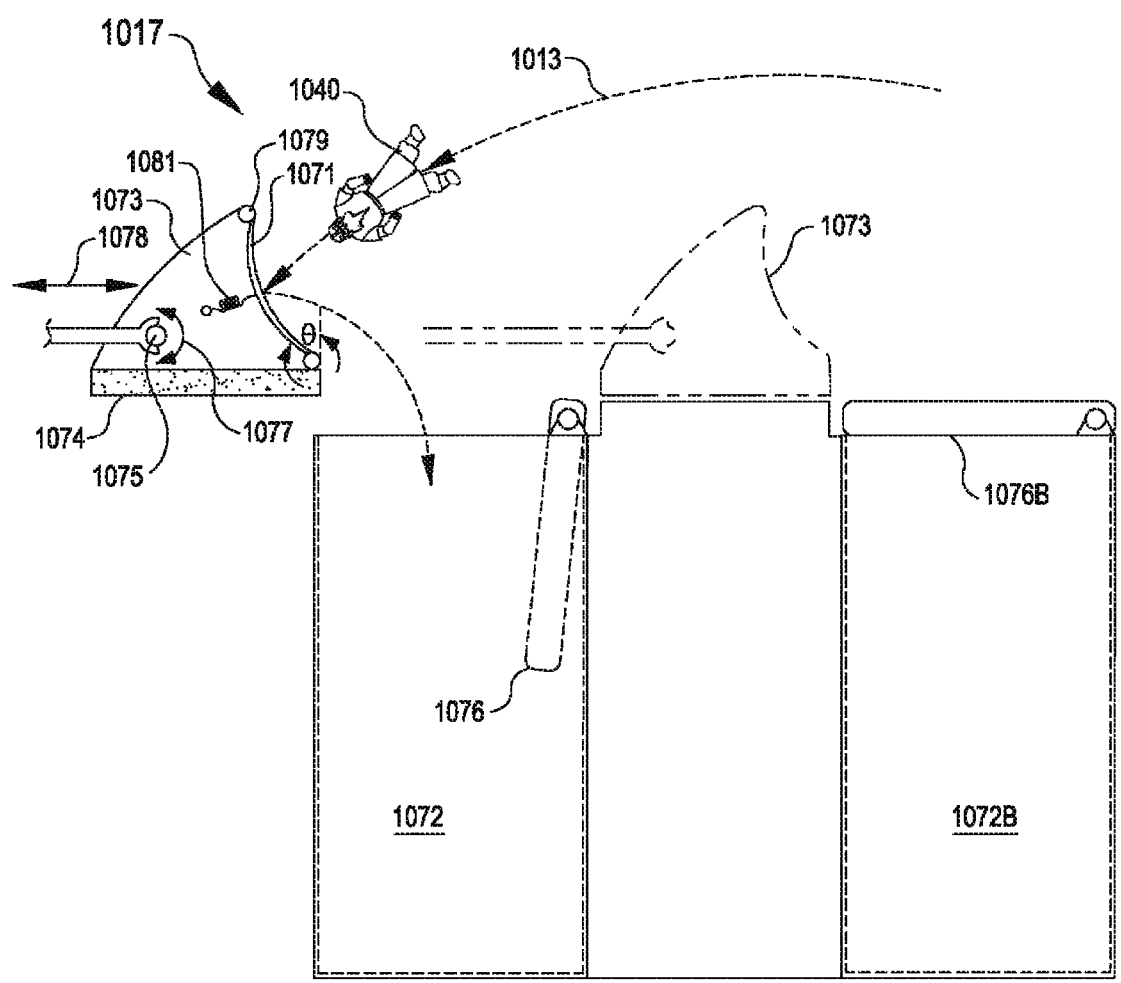

ROBOTIC TOSSING OF ITEMS IN INVENTORY SYSTEM

BACKGROUND

Modern inventory systems, such as those in mail order warehouses, supply chain distribution centers, airport luggage systems, and custom-order manufacturing facilities, face significant challenges in responding to requests for inventory items. As inventory systems grow, the challenges of simultaneously completing a large number of packing, storing, and other inventory-related tasks become nontrivial. In inventory systems tasked with responding to large numbers of diverse inventory requests, inefficient utilization of system resources, including space, equipment, and manpower, can result in lower throughput, unacceptably long response times, an ever-increasing backlog of unfinished tasks, and, in general, poor system performance. Additionally, expanding or reducing the size or capabilities of many inventory systems requires significant changes to existing infrastructure and equipment. As a result, the cost of incremental changes to capacity or functionality may be prohibitively expensive, limiting the ability of the system to accommodate fluctuations in system throughput.

BRIEF DESCRIPTION OF THE DRAWINGS

Various embodiments in accordance with the present disclosure will be describe with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments herein are directed to an inventory system having multiple inventory holders and drive units for moving the inventory holders. Specifically, features herein are directed to robotic arms or manipulators and associated components that may facilitate the movement of inventory items and other features of the inventory system among and between elements of the inventory system. The robotic arms or manipulators may be controlled so as to grasp, move, and release items in manners particularly suited for causing the released items to travel along suitable trajectories from the robotic arms or manipulators to selected receiving locations. For example, a target item, or characteristics thereof, may be identified, such as by optical or other sensors, in order to determine a tossing strategy for tossing the item using a robotic arm to move the item to a receiving zone or location designated for the item. The tossing strategy may be based at least in part upon a database containing information about the item, characteristics of the item, and/or similar items, such as information indicating tossing strategies that have been successful or unsuccessful for such items in the past. The tossing strategy may be based at least in part upon multiple possible trajectories determined to be suitable for moving an item to an intended receiving location. One of the possible trajectories may be selected, for example, based on a reservation system for ensuring that trajectories provided by different robotic arms or manipulators (and/or motions of the robotic arms or manipulators for causing such trajectories) do not interfere with one another, or based on other criteria, such as comparison of efficiency of energy expended in causing the trajectory using a robotic arm or manipulators. Receiving locations may include features that may be modified to particularly accommodate a tossed item and/or the manner in which the item was tossed. Receiving locations can be utilized to facilitate movement of the tossed inventory items to other places within the inventory system.

Figure 1:
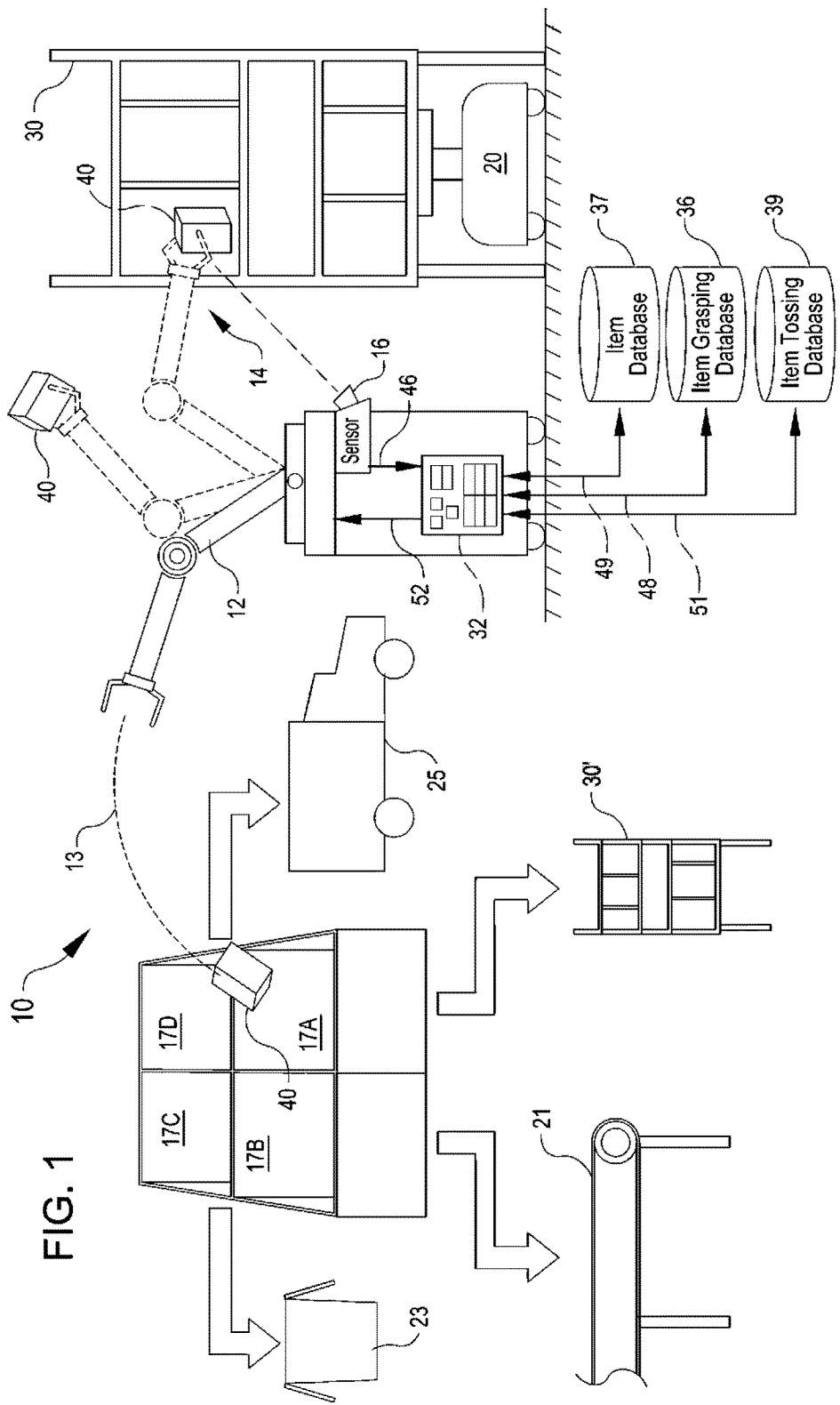
FIG. 1 illustrates an example of an inventory system having a robotic atm configured for tossing inventory items of the inventory system according to various embodiments.
Figure 2:
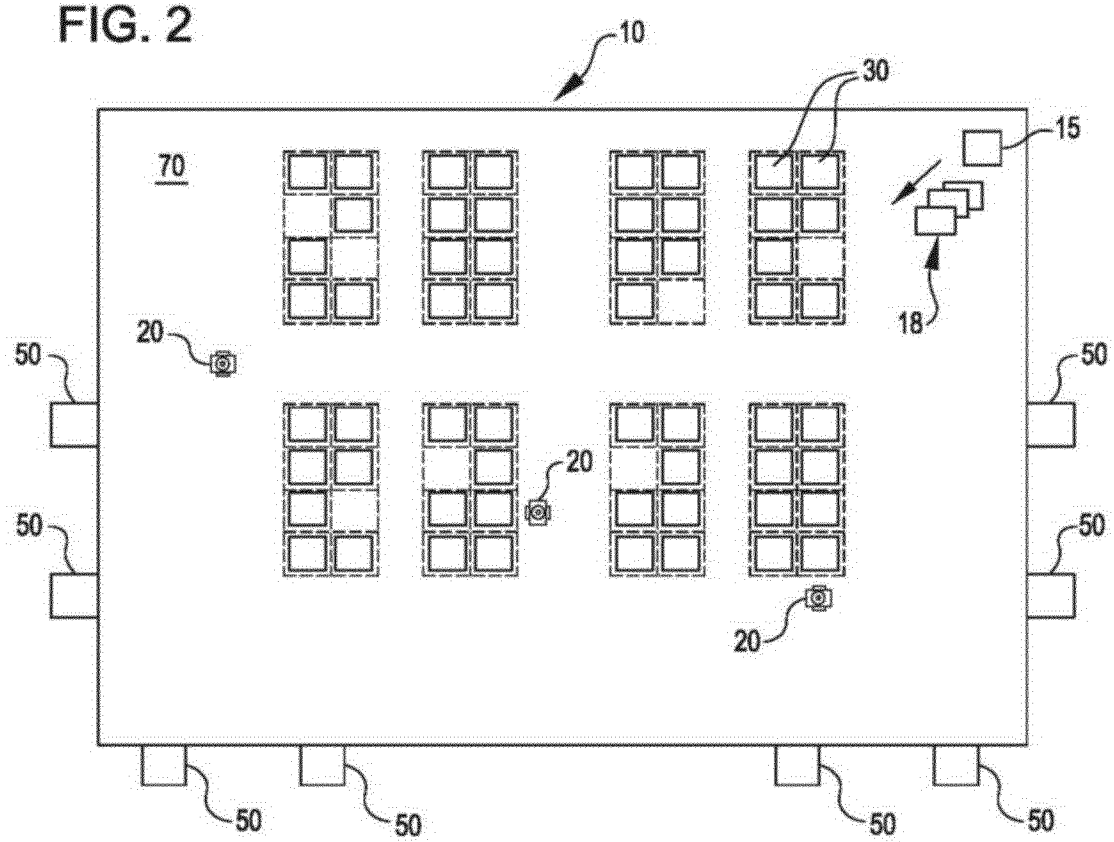
Figure 3:
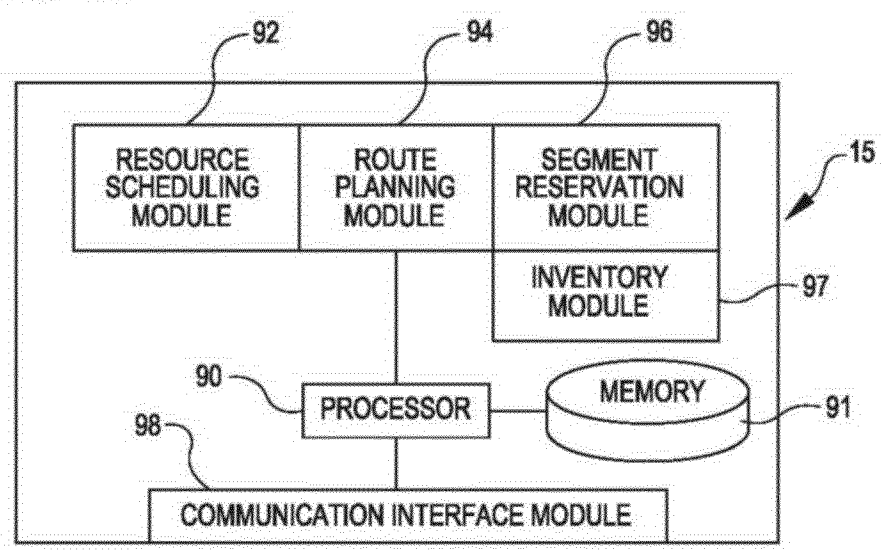

Referring now to the drawings in which like-referenced numerals and/or names may refer to like elements, FIG. 1 illustrates an inventory system 10 having a robotic arm or manipulator 12 configured to toss inventory items 40. Although the description herein primarily refers to a robotic arm, any other mechatronic or robotic device may be used in lieu of or in addition to an arm. The inventory system 10 may include the robotic arm 12, a grasping environment 14, a sensor package 16, a controller 32, an item grasping database 36, an item database 37, and item tossing database 39, and one or more receiving locations 17 (individually identified as 17A, 17B, 17C and 17D in FIG. 1).

In operation, the robotic arm 12 can toss an inventory item 40, such as by performing a series of operations that include grasping the item 40, moving the grasped item 40 to a release point, and releasing the grasped item 40 at the release point to cause the inventory item 40 to travel along a trajectory 13 to a receiving location 17. In various embodiments, utilizing a robotic arm 12 to toss an item 40 to a receiving location 17 can improve throughput through the inventory system 10, such as by reducing an amount of time that may otherwise be consumed by operations of placing a grasped item directly onto a surface for receiving the item 40.

The robotic arm 12 may grasp the item 40 from the grasping environment 14. The grasping environment 14, which is depicted in FIG. 1 as a portion of an inventory holder 30, may correspond to any structure or environment (such as the depicted inventory item 40) maintaining an inventory item 40 that is to be grasped by the robotic arm 12. For example, the grasping environment 14 may equally correspond to a drawer, a tray, a table, a stand, or other structures associated with inventory systems disclosed herein.

The sensor package includes one or more sensors (of like or varying type) arranged to detect the item 40 while the item 40 is being maintained by the grasping environment 14. The sensor package 16 communicates detected attributes (as at 46), such as a weight, geometric characteristics (e.g., size, position or orientation), electrical conductivity, magnetic properties, surface characteristics (e.g., how slippery or porous the item is), deformability, and/or structural integrity of the item 40, to the controller 32. The detected attributes may also include a unique identifier of the item 40, such as a barcode- or RFID-encoded serial number. Based on the detected attributes, the controller 32 may access (as at 49), the item database 37, such as to access a record for the inventory item 40. The record can include information about attributes of the item, such as weight, shape, size, or other physical characteristics of the item. Based on the record from the item database 37 and/or the detected attributes from the sensor package 16, the controller may access (as at 51) the item tossing database 39 to access an item tossing strategy stored for the item 40 or items with similar characteristics.

The controller 32 can provide instructions to the robotic arm 12 for tossing the item 40 based on the tossing strategy accessed from the tossing database at 39 (e.g., at 51). The item tossing strategy can include information about operating the robotic arm 12 in a manner that will cause the item 40 to travel along a suitable trajectory 13 to a receiving location 17. For example, the tossing strategy may include any combination of information about how the item 40 is to be grasped by the robotic arm 12, how the robotic arm 12 is to move while grasping the item 40, and/or a release point at which the robotic arm 12 is to release the item 40. The trajectory 13 can represent a path of travel over a known distance from the robotic arm 12 to the target or designated receiving location 17. The trajectory 13 can include a horizontal and a vertical component of the path of travel of the item 40. For example, the release point of the robotic arm 12 may be horizontally offset from the receiving location. In many examples, the trajectory 13 has endpoints corresponding to a release point from the robotic arm 12 and to a contact point at which the item 40 reaches a surface or other point of reference of the receiving location 17.

In some aspects, the controller 32 can provide instructions to the robotic arm 12 for gripping the item 40 based on a grasping strategy accessed from the item grasping database 36 (e.g., at 52) and, based on the selected grasping strategy, access a tossing strategy for the item 40. In other aspects, the controller 32 may access a particular grasping strategy from the item grasping database 36 (e.g., at 48) based on the tossing strategy accessed from the item tossing database 39 at 51. The item database 37, the item grasping database 36 and the item tossing database 39 (or any combination thereof), although depicted as separate in FIG. 1, may share structure and/or content. Furthermore, development and use of an item gripping database and associated elements that may be utilized for the item grasping database 36 and associated elements is described in U.S. patent application Ser. No. 14/572,420, filed Dec. 16, 2014, entitled "GENERATING ROBOTIC GRASPING INSTRUCTIONS FOR INVENTORY ITEMS" and U.S. patent application Ser. No. 14/572,332, filed Dec. 16, 2014, entitled "ROBOTIC GRASPING OF ITEMS IN INVENTORY SYSTEM", the entire disclosures of which are incorporated herein by reference.

Any suitable receiving location 17 can be provided. In the embodiment illustrated in FIG. 1, the receiving locations 17A-17D include a series of chutes arranged with openings in a horizontal plane. However, any other suitable arrangement of receiving locations 17 can be utilized, including arrangements in a vertical or other non-horizontal plane or surface, and/or structures other than chutes, for example, a set of containers or other defined zones. In one specific alternate example, a receiving location 17 may correspond to a trash receptacle for receiving unwanted items from within the inventory system 10. As another specific example, the receiving locations 17 may correspond to openings in an upright wall. Any receiving location 17 may provide received inventory items 40 to any other location or feature of the inventory system 10. For example, in the embodiment illustrated in FIG. 1, a first receiving location 17A provides routing to another inventory holder 30, while a second receiving location 17B provides routing to a conveyor belt 21, a third receiving location 17C provides routing to a container 23, and a fourth receiving location 17D provides routing to a truck or other delivery vehicle 25. The receiving locations 17 may utilize any appropriate form of conveyance mechanism to provide routing, including, but not limited to, chutes, slides, ramps, conveyors, lifts, pushers, pullers, etc.

Thus, in the illustrative example shown in FIG. 1, the inventory system 10 (e.g., via the controller 32) may receive a request that a particular inventory item 40, illustrated as a figurine of a dwarf 40, be moved to storage on a lower floor of the inventory system 10. In response, the inventory system 10 determines the location of the dwarf 40 (e.g., based on the item database 37), determines that the first receiving location 17A can provide appropriate routing to achieve this objective, and determines that the robotic arm 12 is available for tossing the dwarf 40 to the first receiving location 17A. The inventory system 10 causes the dwarf 40 to be brought within reach of the robotic arm 12 (for example, by instructing a mobile drive unit 20 to move an inventory holder 30 carrying the dwarf 40 to a suitable location). Information from the sensor package 16 and/or item database 37 is used to determine a trajectory 13 for tossing the dwarf 40 by the robotic arm 12 across a known distance to the first receiving location 17A. A tossing strategy (and potentially an associated gripping strategy) for operating the robotic arm. 12 to achieve the trajectory 13 is determined (e.g., based on information from the item tossing database 39 and item grasping database 36). The robotic arm 12 is operated according to the tossing strategy (e.g., grasps the dwarf 40 with a mechanical gripper, carries the dwarf in an overhand are executed by the robotic arm 12, and releases the dwarf 40 from the gripper at a calculated point in the arc). The robotic arm 12 thus tosses the dwarf 40 into the first receiving location 17A so that the tossed dwarf 40 is transferred down the corresponding chute to be loaded into another inventory holder 30' for subsequent access on the lower floor.

Figure 2:
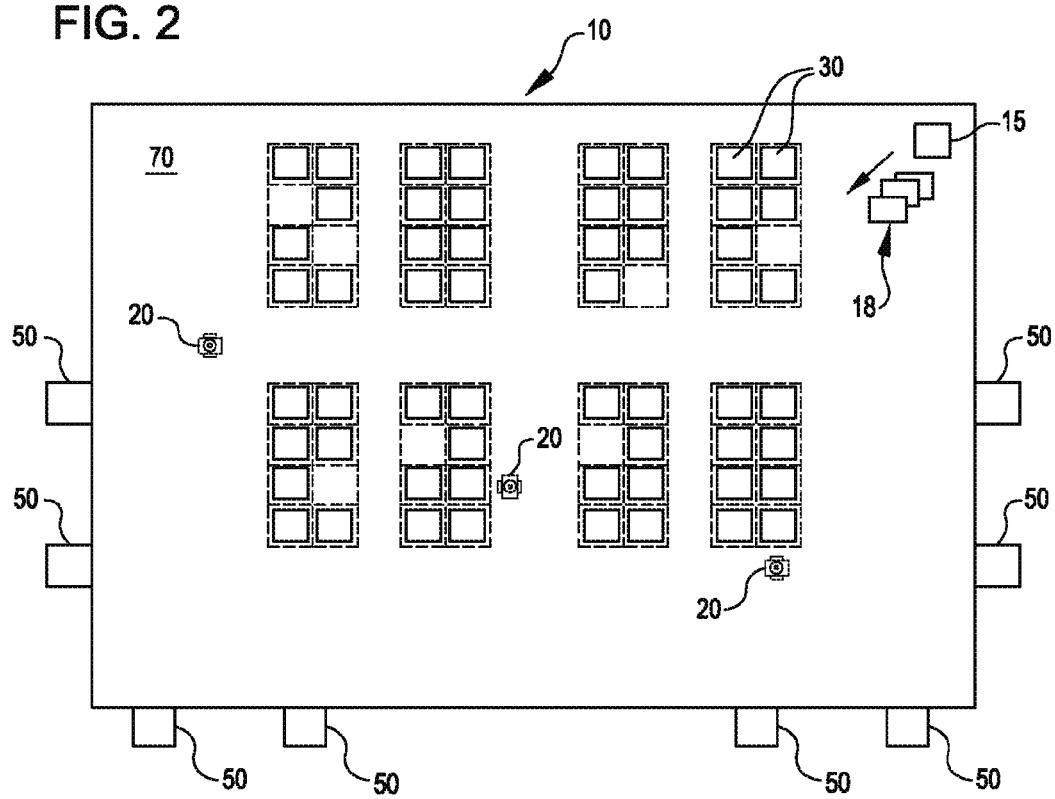
FIG. 2 illustrates components of an inventory system according to a various embodiments.

FIG. 2 illustrates the contents of an inventory system 10. Inventory system 10 includes a management module 15, one or more mobile drive units 20, one or more inventory holders 30, and one or more inventory stations 50. Mobile drive units 20 transport inventory holders 30 between points within a workspace 70 in response to commands communicated by management module 15. Each inventory holder 30 stores one or more types of inventory items. As a result, inventory system is capable of moving inventory items between locations within workspace 70 to facilitate the entry, processing, and/or removal of inventory items from inventory system 10 and the completion of other tasks involving inventory items.

Management module 15 assigns tasks to appropriate components of inventory system 10 and coordinates operation of the various components in completing the tasks. These tasks may relate not only to the movement and processing of inventory items, but also to the management and maintenance of the components of inventory system 10. For example, management module 15 may assign portions of workspace 70 as parking spaces for mobile drive units 20, the scheduled recharge or replacement of mobile drive unit batteries, the storage of empty inventory holders 30, or any other operations associated with the functionality supported by inventory system 10 and its various components. Management module 15 may select components of inventory system 10 to perform these tasks and communicate appropriate commands and/or data to the selected components to facilitate completion of these operations. Although shown in FIG. 2 as a single, discrete component, management module 15 may represent multiple components and may represent or include portions of mobile drive units 20 or other elements of inventory system 10. As a result, any or all of the interaction between a particular mobile drive unit 20 and management module 15 that is described below may, in particular embodiments, represent peer-to-peer communication between that mobile drive unit 20 and one or more other mobile drive units 20. The contents and operation of an example embodiment of management module 15 are discussed further below with respect to FIG. 3.

Mobile drive units 20 move inventory holders 30 between locations within workspace 70. Mobile drive units 20 may represent any devices or components appropriate for use in inventory system 10 based on the characteristics and configuration of inventory holders 30 and/or other elements of inventory system 10. In a particular embodiment of inventory system 10, mobile drive units 20 represent independent, self-powered devices configured to freely move about workspace 70. Examples of such inventory systems are disclosed in U.S. Patent Publication No. 2012/0143427, published on Jun. 7, 2012, titled "SYSTEM AND METHOD FOR POSITIONING A MOBILE DRIVE UNIT" and U.S. Pat. No. 8,280,547, issued on Oct. 2, 2012, titled "METHOD AND SYSTEM FOR TRANSPORTING INVENTORY ITEMS", the entire disclosures of which are herein incorporated by reference. In alternative embodiments, mobile drive units 20 represent elements of a tracked inventory system configured to move inventory holder 30 along tracks, rails, cables, crane system, or other guidance or support elements traversing workspace 70. In such an embodiment, mobile drive units 20 may receive power and/or support through a connection to the guidance elements, such as a powered rail. Additionally, in particular embodiments of inventory system 10 mobile drive units 20 may be configured to utilize alternative conveyance equipment to move within workspace 70 and/or between separate portions of workspace 70. The contents and operation of an example embodiment of a mobile drive unit 20 are discussed further below with respect to FIGS. 4 and 5.

Additionally, mobile drive units 20 may be capable of communicating with management module 15 to receive information identifying selected inventory holders 30, transmit the locations of mobile drive units 20, or exchange any other suitable information to be used by management module 15 or mobile drive units 20 during operation. Mobile drive units 20 may communicate with management module 15 wirelessly, using wired connections between mobile drive units 20 and management module 15, and/or in any other appropriate manner. As one example, particular embodiments of mobile drive unit 20 may communicate with management module 15 and/or with one another using 802.11, Bluetooth, or Infrared Data Association (IrDA) standards, or any other appropriate wireless communication protocol. As another example, in a tracked inventory system 10, tracks or other guidance elements upon which mobile drive units 20 move may be wired to facilitate communication between mobile drive units 20 and other components of inventory system 10. Furthermore, as noted above, management module 15 may include components of individual mobile drive units 20. Thus, for the purposes of this description and the claims that follow, communication between management module 15 and a particular mobile drive unit 20 may represent communication between components of a particular mobile drive unit 20. In general, mobile drive units 20 may be powered, propelled, and controlled in any manner appropriate based on the configuration and characteristics of inventory system 10.

Inventory holders 30 store inventory items. In a particular embodiment, inventory holders 30 include multiple storage bins with each storage bin capable of holding one or more types of inventory items. Inventory holders 30 are capable of being carried, rolled, and/or otherwise moved by mobile drive units 20. In particular embodiments, inventory holder 30 may provide additional propulsion to supplement that provided by mobile drive unit 20 when moving inventory holder 30.

Additionally, in particular embodiments, inventory items 40 may also hang from hooks or bars (not shown) within or on inventory holder 30. In general, inventory holder 30 may store inventory items 40 in any appropriate manner within inventory holder 30 and/or on the external surface of inventory holder 30.

Additionally, each inventory holder 30 may include a plurality of faces, and each bin may be accessible through one or more faces of the inventory holder 30. For example, in a particular embodiment, inventory holder 30 includes four faces. In such an embodiment, bins located at a corner of two faces may be accessible through either of those two faces, while each of the other bins is accessible through an opening in one of the four faces. Mobile drive unit 20 may be configured to rotate inventory holder 30 at appropriate times to present a particular face and the bins associated with that face to an operator or other components of inventory system 10.

Inventory items represent any objects suitable for storage, retrieval, and/or processing in an automated inventory system 10. For the purposes of this description, "inventory items" may represent any one or more objects of a particular type that are stored in inventory system 10. Thus, a particular inventory holder 30 is currently "storing" a particular inventory item if the inventory holder 30 currently holds one or more units of that type. As one example, inventory system 10 may represent a mail order warehouse facility, and inventory items may represent merchandise stored in the warehouse facility. During operation, mobile drive units 20 may retrieve inventory holders 30 containing one or more inventory items requested in an order to be packed for delivery to a customer or inventory holders 30 carrying pallets containing aggregated collections of inventory items for shipment. Moreover, in particular embodiments of inventory system 10, boxes containing completed orders may themselves represent inventory items.

In particular embodiments, inventory system 10 may also include one or more inventory stations 50. Inventory stations 50 represent locations designated for the completion of particular tasks involving inventory items. Such tasks may include the removal of inventory items from inventory holders 30, the introduction of inventory items into inventory holders 30, the counting of inventory items in inventory holders 30, the decomposition of inventory items (e.g. from pallet- or case-sized groups to individual inventory items), the consolidation of inventory items between inventory holders 30, and/or the processing or handling of inventory items in any other suitable manner. In particular embodiments, inventory stations 50 may just represent the physical locations where a particular task involving inventory items can be completed within workspace 70. In alternative embodiments, inventory stations 50 may represent both the physical location and also any appropriate equipment for processing or handling inventory items, such as scanners for monitoring the flow of inventory items in and out of inventory system 10, communication interfaces for communicating with management module 15, and/or any other suitable components, inventory stations 50 may be controlled, entirely or in part, by human operators or may be fully automated. Moreover, the human or automated operators of inventory stations 50 may be capable of performing certain tasks to inventory items, such as packing, counting, or transferring inventory items, as part of the operation of inventory system 10.

Workspace 70 represents an area associated with inventory system 10 in which mobile drive units 20 can move and/or inventory holders 30 can be stored. For example, workspace 70 may represent all or part of the floor of a mail-order warehouse in which inventory system 10 operates. Although FIG. 2 shows, for the purposes of illustration, an embodiment of inventory system 10 in which workspace 70 includes a fixed, predetermined, and finite physical space, particular embodiments of inventory system 10 may include mobile drive units 20 and inventory holders 30 that are configured to operate within a workspace 70 that is of variable dimensions and/or an arbitrary geometry. While FIG. 2 illustrates a particular embodiment of inventory system 10 in which workspace 70 is entirely enclosed in a building, alternative embodiments may utilize workspaces 70 in which some or all of the workspace 70 is located outdoors, within a vehicle (such as a cargo ship), or otherwise unconstrained by any fixed structure.

In operation, management module 15 selects appropriate components to complete particular tasks and transmits task assignments 18 to the selected components to trigger completion of the relevant tasks. Each task assignment 18 defines one or more tasks to be completed by a particular component. These tasks may relate to the retrieval, storage, replenishment, and counting of inventory items and/or the management of mobile drive units 20, inventory holders 30, inventory stations 50 and other components of inventory system 10. Depending on the component and the task to be completed, a particular task assignment 18 may identify locations, components, and/or actions associated with the corresponding task and/or any other appropriate information to be used by the relevant component in completing the assigned task.

In particular embodiments, management module 15 generates task assignments 18 based, in part, on inventory requests that management module 15 receives from other components of inventory system 10 and/or from external components in communication with management module 15. These inventory requests identify particular operations to be completed involving inventory items stored or to be stored within inventory system 10 and may represent communication of any suitable form. For example, in particular embodiments, an inventory request may represent a shipping order specifying particular inventory items that have been purchased by a customer and that are to be retrieved from inventory system 10 for shipment to the customer. Management module 15 may also generate task assignments 18 independently of such inventory requests, as part of the overall management and maintenance of inventory system 10. For example, management module 15 may generate task assignments 18 in response to the occurrence of a particular event (e.g., in response to a mobile drive unit 20 requesting a space to park), according to a predetermined schedule (e.g., as part of a daily start-up routine), or at any appropriate time based on the configuration and characteristics of inventory system 10. After generating one or more task assignments 18, management module 15 transmits the generated task assignments 18 to appropriate components for completion of the corresponding task. The relevant components then execute their assigned tasks.

With respect to mobile drive units 20 specifically, management module 15 may, in particular embodiments, communicate task assignments 18 to selected mobile drive units 20 that identify one or more destinations for the selected mobile drive units 20. Management module 15 may select a mobile drive unit 20 to assign the relevant task based on the location or state of the selected mobile drive unit 20, an indication that the selected mobile drive unit 20 has completed a previously-assigned task, a predetermined schedule, and/or any other suitable consideration. These destinations may be associated with an inventory request the management module 15 is executing or a management objective the management module 15 is attempting to fulfill. For example, the task assignment may define the location of an inventory holder 30 to be retrieved, an inventory station 50 to be visited, a storage location where the mobile drive unit 20 should park until receiving another task, or a location associated with any other task appropriate based on the configuration, characteristics, and/or state of inventory system 10, as a whole, or individual components of inventory system 10. For example, in particular embodiments, such decisions may be based on the popularity of particular inventory items, the staffing of a particular inventory station 50, the tasks currently assigned to a particular mobile drive unit 20, and/or any other appropriate considerations.

As part of completing these tasks mobile drive units 20 may dock with and transport inventory holders 30 within workspace 70. Mobile drive units 20 may dock with inventory holders 30 by connecting to, lifting, and/or otherwise interacting with inventory holders 30 in any other suitable manner so that, when docked, mobile drive units 20 are coupled to and/or support inventory holders 30 and can move inventory holders 30 within workspace 70. While the description below focuses on particular embodiments of mobile drive unit 20 and inventory holder 30 that are configured to dock in a particular manner, alternative embodiments of mobile drive unit 20 and inventory holder 30 may be configured to dock in any manner suitable to allow mobile drive unit 20 to move inventory holder 30 within workspace 70. Additionally, as noted below, in particular embodiments, mobile drive units 20 represent all or portions of inventory holders 30. In such embodiments, mobile drive units 20 may not dock with inventory holders 30 before transporting inventory holders 30 and/or mobile drive units 20 may each remain continually docked with a particular inventory holder 30.

While the appropriate components of inventory system 10 complete assigned tasks, management module 15 may interact with the relevant components to ensure the efficient use of space, equipment, manpower, and other resources available to inventory system 10. As one specific example of such interaction, management module 15 is responsible, in particular embodiments, for planning the paths mobile drive units 20 take when moving within workspace 70 and for allocating use of a particular portion of workspace 70 to a particular mobile drive unit 20 for purposes of completing an assigned task. In such embodiments, mobile drive units 20 may, in response to being assigned a task, request a path to a particular destination associated with the task. Moreover, while the description below focuses on one or more embodiments in which mobile drive unit 20 requests paths from management module 15, mobile drive unit 20 may, in alternative embodiments, generate its own paths.

Components of inventory system 10 may provide information to management module 15 regarding their current state, other components of inventory system. 10 with which they axe interacting, and/or other conditions relevant to the operation of inventory system 10. This may allow management module 15 to utilize feedback from the relevant components to update algorithm parameters, adjust policies, or otherwise modify its decision-making to respond to changes in operating conditions or the occurrence of particular events.

In addition, while management module 15 may be configured to manage various aspects of the operation of the components of inventory system 10, in particular embodiments, the components themselves may also be responsible for decision-making relating to certain aspects of their operation, thereby reducing the processing load on management module 15.

Thus, based on its knowledge of the location, current state, and/or other characteristics of the various components of inventory system 10 and an awareness of all the tasks currently being completed, management module 15 can generate tasks, allot usage of system resources, and otherwise direct the completion of tasks by the individual components in a manner that optimizes operation from a system-wide perspective. Moreover, by relying on a combination of both centralized, system-wide management and localized, component-specific decision-making, particular embodiments of inventory system 10 may be able to support a number of techniques for efficiently executing various aspects of the operation of inventory system 10. As a result, particular embodiments of management module 15 may, by implementing one or more management techniques described below, enhance the efficiency of inventory system 10 and/or provide other operational benefits.

Figure 3:
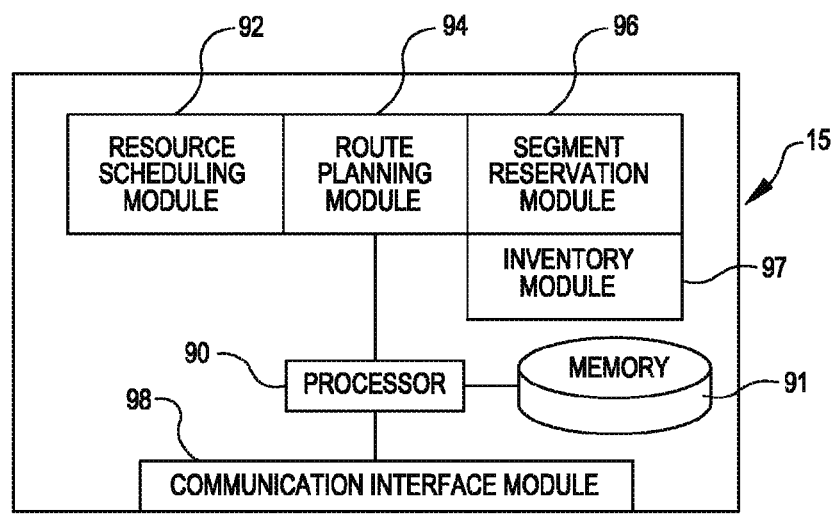
FIG. 3 illustrates in greater detail the components of an example management module that may be utilized in particular embodiments of the inventory system shown in FIG. 2.

FIG. 3 illustrates in greater detail the components of a particular embodiment of management module 15. As shown, the example embodiment includes a resource scheduling module 92, a route planning module 94, a segment reservation module 96, an inventory module 97, a communication interface module 98, a processor 90, and a memory 91. Management module 15 may represent a single component, multiple components located at a central location within inventory system 10, or multiple components distributed throughout inventory system 10. For example, management module 15 may represent components of one or more mobile drive units 20 that are capable of communicating information between the mobile drive units 20 and coordinating the movement of mobile drive units 20 within workspace 70. In general, management module 15 may include any appropriate combination of hardware and/or software suitable to provide the described functionality.

Processor 90 is operable to execute instructions associated with the functionality provided by management module 15. Processor 90 may comprise one or more general purpose computers, dedicated microprocessors, or other processing devices capable of communicating electronic information. Examples of processor 90 include one or more application-specific integrated circuits (ASICs), field programmable gate arrays (FPGAs), digital signal processors (DSPs) and any other suitable specific or general purpose processors.

Memory 91 stores processor instructions, inventory requests, reservation information, state information for the various components of inventory system 10 and/or any other appropriate values, parameters, or information utilized by management module 15 during operation. Memory 91 may represent any collection and arrangement of volatile or nonvolatile, local or remote devices suitable for storing data. Examples of memory 91 include, but are not limited to, random access memory (RAM) devices, read only memory (ROM) devices, magnetic storage devices, optical storage devices or any other suitable data storage devices.

Resource scheduling module 92 processes received inventory requests and generates one or more assigned tasks to be completed by the components of inventory system 10. Resource scheduling module 92 may also select one or more appropriate components for completing the assigned tasks and, using communication interface module 98, communicate the assigned tasks to the relevant components. Additionally, resource scheduling module 92 may also be responsible for generating assigned tasks associated with various management operations, such as prompting mobile drive units 20 to recharge batteries or have batteries replaced, instructing inactive mobile drive units 20 to park in a location outside the anticipated traffic flow or a location near the anticipated site of future tasks, and/or directing mobile drive units 20 selected for repair or maintenance to move towards a designated maintenance station.

Route planning module 94 receives route requests from mobile drive units 20. These route requests identify one or more destinations associated with a task the requesting mobile drive unit 20 is executing. In response to receiving a route request, route planning module 94 generates a path to one or more destinations identified in the route request. Route planning module 94 may implement any appropriate algorithms utilizing any appropriate parameters, factors, and/or considerations to determine the appropriate path. After generating an appropriate path, route planning module 94 transmits a route response identifying the generated path to the requesting mobile drive unit 20 using communication interface module 98.

Segment reservation module 96 receives reservation requests from mobile drive units 20 attempting to move along paths generated by route planning module 94. These reservation requests request the use of a particular portion of workspace 70 (referred to herein as a "segment") to allow the requesting mobile drive unit 20 to avoid collisions with other mobile drive units 20 while moving across the reserved segment. In response to received reservation requests, segment reservation module 96 transmits a reservation response granting or denying the reservation request to the requesting mobile drive unit 20 using the communication interface module 98.

The inventory module 97 maintains information about the location and number of inventory items 40 in the inventory system 10. Information can be maintained about the number of inventory items 40 in a particular inventory holder 30, and the maintained information can include the location of those inventory items 40 in the inventory holder 30. The inventory module 97 can also communicate with the mobile drive units 20, utilizing task assignments 18 to maintain, replenish or move inventory items 40 within the inventory system 10.

Communication interface module 98 facilitates communication between management module 15 and other components of inventory system 10, including reservation responses, reservation requests, route requests, route responses, and task assignments. These reservation responses, reservation requests, route requests, route responses, and task assignments may represent communication of any form appropriate based on the capabilities of management module 15 and may include any suitable information. Depending on the configuration of management module 15, communication interface module 98 may be responsible for facilitating either or both of wired and wireless communication between management module 15 and the various components of inventory system 10. In particular embodiments, management module 15 may communicate using communication protocols such as 802.11 Bluetooth, or Infrared Data Association (IrDA) standards. Furthermore, management module 15 may, in particular embodiments, represent a portion of mobile drive unit 20 or other components of inventory system 10. In such embodiments, communication interface module 98 may facilitate communication between management module 15 and other parts of the same system component.

In general, resource scheduling module 92, route planning module 94, segment reservation module 96, inventory module 97, and communication interface module 98 may each represent any appropriate hardware and/or software suitable to provide the described functionality. In addition, as noted above, management module 15 may, in particular embodiments, represent multiple different discrete components and any or all of resource scheduling module 92, route planning module 94, segment reservation module 96, inventory module 97, and communication interface module 98 may represent components physically separate from the remaining elements of management module 15. Moreover, any two or more of resource scheduling module 92, route planning module 94, segment reservation module 96, inventory module 97, and communication interface module 98 may share common components. For example, in particular embodiments, resource scheduling module 92, route planning module 94, segment reservation module 96, and inventory module 97 represent computer processes executing on processor 90 and communication interface module 98 comprises a wireless transmitter, a wireless receiver, and a related computer process executing on processor 90.

Figure 4:
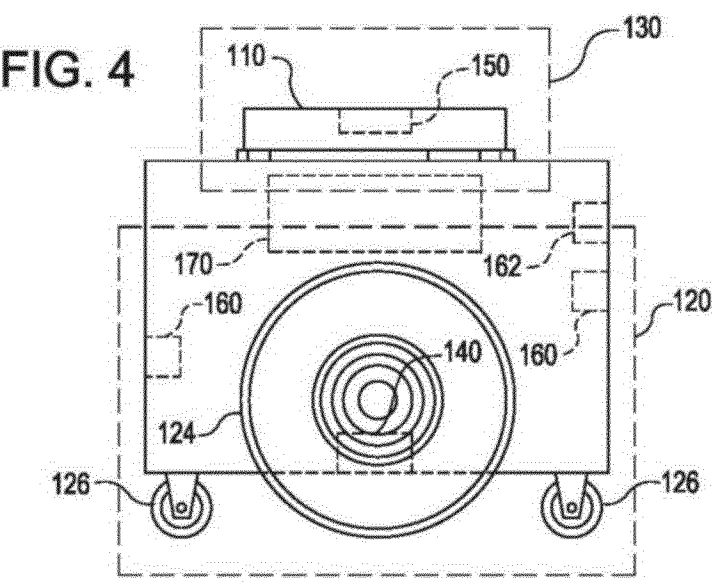
FIGS. 4 and 5 illustrate in greater detail an example mobile drive unit that may be utilized in particular embodiments of the inventory system shown in FIG. 2.
Figure 5:
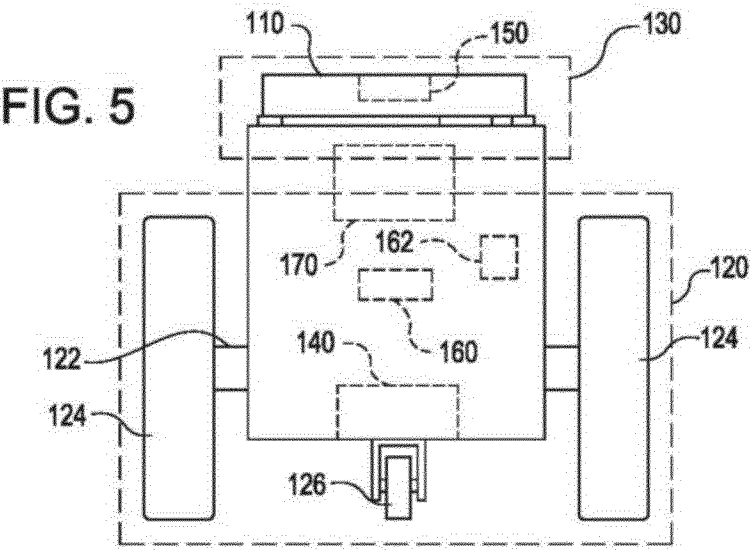
Figure 6:
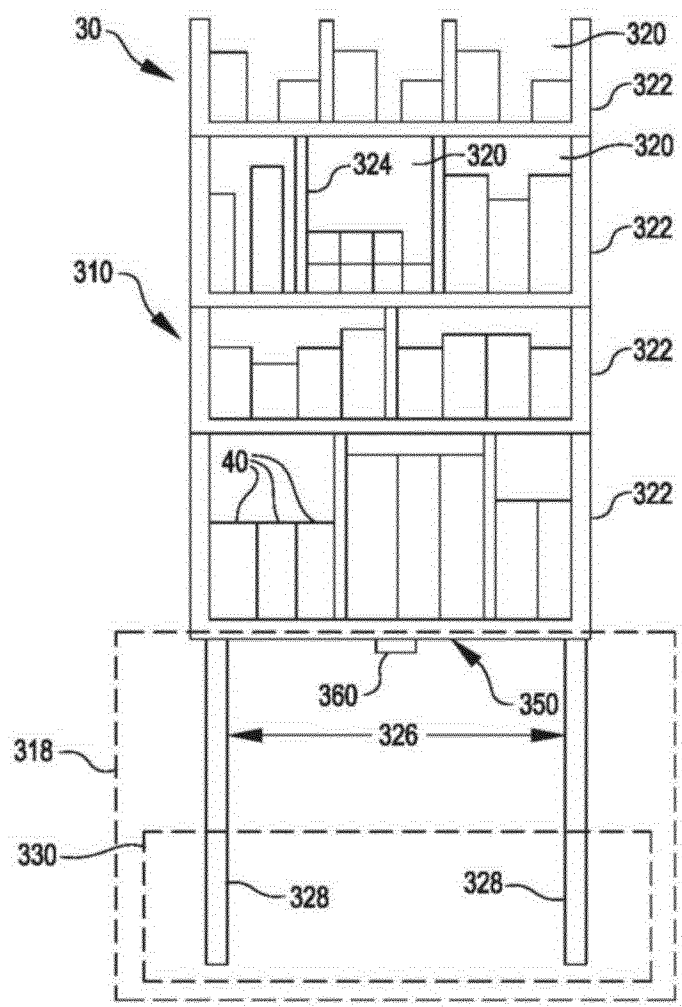
Figure 7:
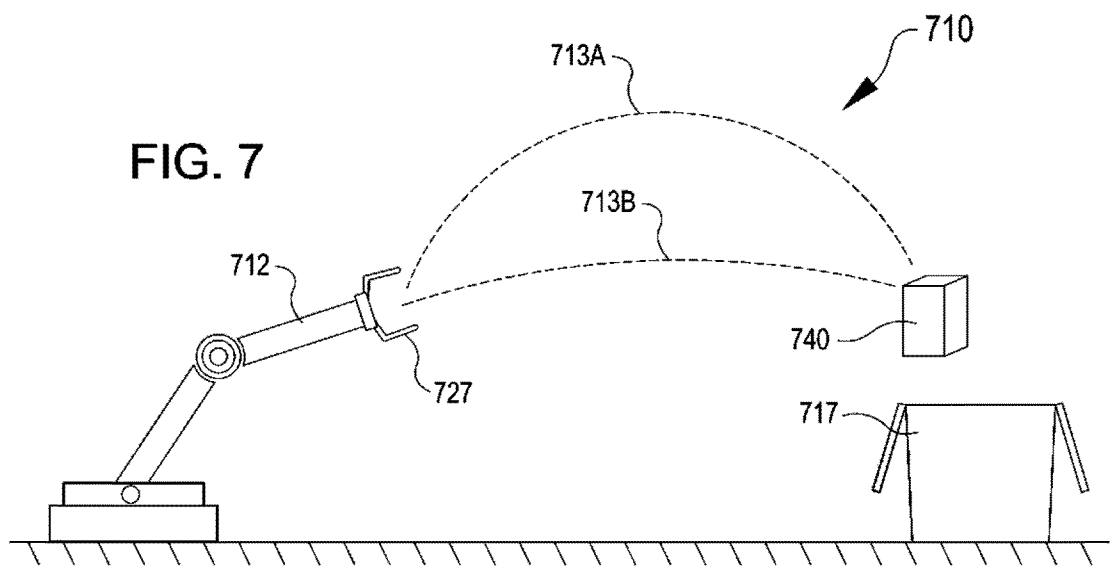
Figure 8:
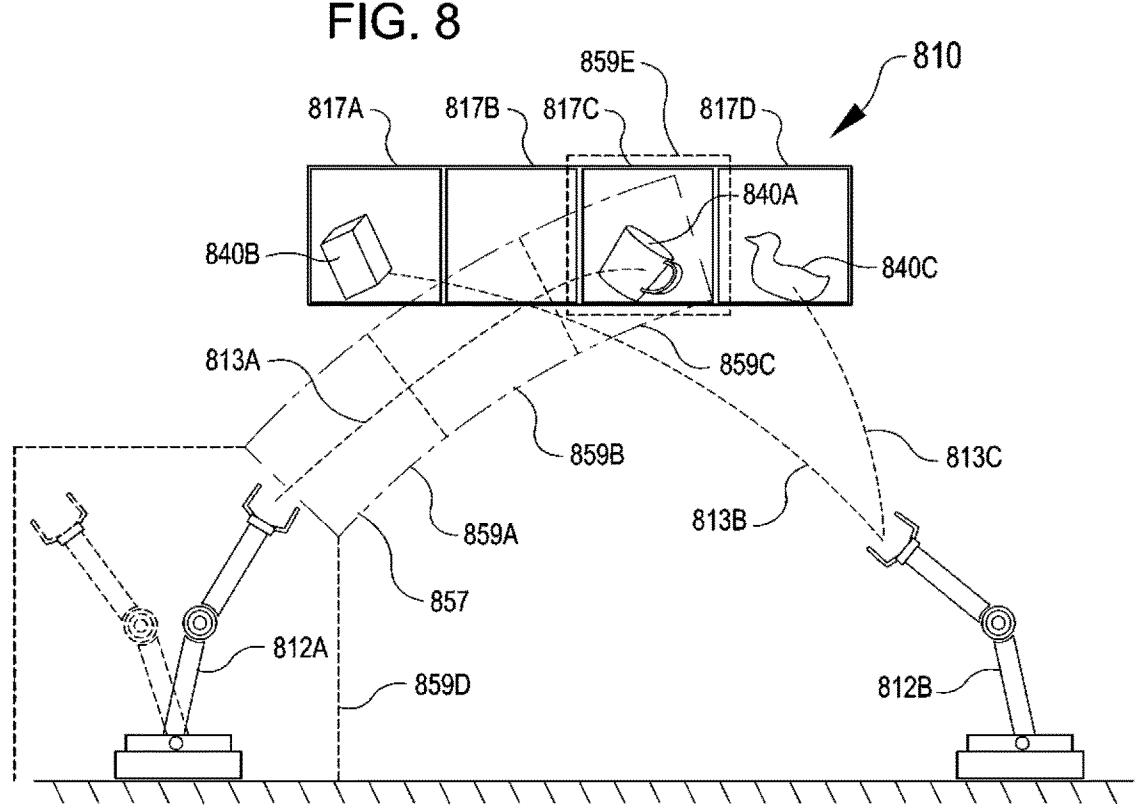

FIGS. 4 and 5 illustrate in greater detail the components of a particular embodiment of mobile drive unit 20. In particular, FIGS. 4 and 5 include a side and front view of an example mobile drive unit 20. Mobile drive unit 20 includes a docking head 110, a drive module 120, a docking actuator 130, and a control module 170. Additionally, mobile drive unit 20 may include one or more sensors configured to detect or determine the location of mobile drive unit 20, inventory holder 30, and/or other appropriate elements of inventory system 10. In the illustrated embodiment, mobile drive unit 20 includes a position sensor 140, a holder sensor 150, an obstacle sensor 160, and an identification signal transmitter 162.

Docking head 110, in particular embodiments of mobile drive unit 20, couples mobile drive unit 20 to inventory holder 30 and/or supports inventory holder 30 when mobile drive unit 20 is docked to inventory holder 30. Docking head 110 may additionally allow mobile drive unit 20 to maneuver inventory holder 30, such as by lifting inventory holder 30, propelling inventory holder 30, rotating inventory holder 30, and/or moving inventory holder 30 in any other appropriate manner. Docking head 110 may also include any appropriate combination of components, such as ribs, spikes, and/or corrugations, to facilitate such manipulation of inventory holder 30. For example, in particular embodiments, docking head 110 may include a high-friction portion that abuts a portion of inventory holder 30 while mobile drive unit 20 is docked to inventory holder 30. In such embodiments, frictional forces created between the high-friction portion of docking head 110 and a surface of inventory holder 30 may induce translational and rotational movement in inventory holder 30 when docking head 110 moves and rotates, respectively. As a result, mobile drive unit 20 may be able to manipulate inventory holder 30 by moving or rotating docking head 110, either independently or as a part of the movement of mobile drive unit 20 as a whole.

Drive module 120 propels mobile drive unit 20 and, when mobile drive unit 20 and inventory holder 30 are docked, inventory holder 30. Drive module 120 may represent any appropriate collection of components operable to propel mobile drive unit 20. For example, in the illustrated embodiment, drive module 120 includes motorized axle 122, a pair of motorized wheels 124, and a pair of stabilizing wheels 126. One motorized wheel 124 is located at each end of motorized axle 122, and one stabilizing wheel 126 is positioned at each end of mobile drive unit 20.

Docking actuator 130 moves docking head 110 towards inventory holder 30 to facilitate docking of mobile drive unit 20 and inventory holder 30. Docking actuator 130 may also be capable of adjusting the position or orientation of docking head 110 in other suitable manners to facilitate docking. Docking actuator 130 may include any appropriate components, based on the configuration of mobile drive unit 20 and inventory holder 30, for moving docking head 110 or otherwise adjusting the position or orientation of docking head 110. For example, in the illustrated embodiment, docking actuator 130 includes a motorized shaft (not shown) attached to the center of docking head 110. The motorized shaft is operable to lift docking head 110 as appropriate for docking with inventory holder 30.

Drive module 120 may be configured to propel mobile drive unit 20 in any appropriate manner. For example, in the illustrated embodiment, motorized wheels 124 are operable to rotate in a first direction to propel mobile drive unit 20 in a forward direction. Motorized wheels 124 are also operable to rotate in a second direction to propel mobile drive unit 20 in a backward direction. In the illustrated embodiment, drive module 120 is also configured to rotate mobile drive unit 20 by rotating motorized wheels 124 in different directions from one another or by rotating motorized wheels 124 at different speeds from one another.

Position sensor 140 represents one or more sensors, detectors, or other components suitable for determining the location of mobile drive unit 20 in any appropriate manner. For example, in particular embodiments, the workspace 70 associated with inventory system 10 includes a number of fiducial marks that mark points on a two-dimensional grid that covers all or a portion of workspace 70. In such embodiments, position sensor 140 may include a camera and suitable image- and/or video-processing components, such as an appropriately-programmed digital signal processor, to allow position sensor 140 to detect fiducial marks within the camera's field of view. Control module 170 may store location information that position sensor 140 updates as position sensor 140 detects fiducial marks. As a result, position sensor 140 may utilize fiducial marks to maintain an accurate indication of the location mobile drive unit 20 and to aid in navigation when moving within workspace 70.

Holder sensor 150 represents one or more sensors, detectors, or other components suitable for detecting inventory holder 30 and/or determining, in any appropriate manner, the location of inventory holder 30, as an absolute location or as a position relative to mobile drive unit 20. Holder sensor 150 may be capable of detecting the location of a particular portion of inventory holder 30 or inventory holder 30 as a whole. Mobile drive unit 20 may then use the detected information for docking with or otherwise interacting with inventory holder 30.

Obstacle sensor 160 represents one or more sensors capable of detecting objects located in one or more different directions in which mobile drive unit 20 is capable of moving. Obstacle sensor 160 may utilize any appropriate components and techniques, including optical, radar, sonar, pressure-sensing and/or other types of detection devices appropriate to detect objects located in the direction of travel of mobile drive unit 20. In particular embodiments, obstacle sensor 160 may transmit information describing objects it detects to control module 170 to be used by control module 170 to identify obstacles and to take appropriate remedial actions to prevent mobile drive unit 20 from colliding with obstacles and/or other objects.

Obstacle sensor 160 may also detect signals transmitted by other mobile drive units 20 operating in the vicinity of the illustrated mobile drive unit 20. For example, in particular embodiments of inventory system 10, one or more mobile drive units 20 may include an identification signal transmitter 162 that transmits a drive identification signal. The drive identification signal indicates to other mobile drive units 20 that the object transmitting the drive identification signal is in fact a mobile drive unit. Identification signal transmitter 162 may be capable of transmitting infrared, ultraviolet, audio, visible light, radio, and/or other suitable signals that indicate to recipients that the transmitting device is a mobile drive unit 20.

Additionally, in particular embodiments, obstacle sensor 160 may also be capable of detecting state information transmitted by other mobile drive units 20. For example, in particular embodiments, identification signal transmitter 162 may be capable of including state information relating to mobile drive unit 20 in the transmitted identification signal. This state information may include, but is not limited to, the position, velocity, direction, and the braking capabilities of the transmitting mobile drive unit 20. In particular embodiments, mobile drive unit 20 may use the state information transmitted by other mobile drive units to avoid collisions when operating in close proximity with those other mobile drive units.

Control module 170 monitors and/or controls operation of drive module 120 and docking actuator 130. Control module 170 may also receive information from sensors such as position sensor 140 and holder sensor 150 and adjust the operation of drive module 120, docking actuator 130, and/or other components of mobile drive unit 20 based on this information. Additionally, particular embodiments, mobile drive unit 20 may be configured to communicate with a management device of inventory system 10 and control module 170 may receive commands transmitted to mobile drive unit 20 and communicate information back to the management device utilizing appropriate communication components of mobile drive unit 20. Control module 170 may include any appropriate hardware and/or software suitable to provide the described functionality. In particular embodiments, control module 170 includes a general-purpose microprocessor programmed to provide the described functionality. Additionally, control module 170 may include all or portions of docking actuator 130, drive module 120, position sensor 140, and/or holder sensor 150, and/or share components with any of these elements of mobile drive unit 20.

Moreover, in particular embodiments, control module 170 may include hardware and software located in components that are physically distinct from the device that houses drive module 120, docking actuator 130, and/or the other components of mobile drive unit 20 described above. For example, in particular embodiments, each mobile drive unit 20 operating in inventory system 10 may be associated with a software process (referred to here as a "drive agent") operating on a server that is in communication with the device that houses drive module 120, docking actuator 130, and other appropriate components of mobile drive unit 20. This drive agent may be responsible for requesting and receiving tasks, requesting and receiving routes, transmitting state information associated with mobile drive unit 20, and/or otherwise interacting with management module 15 and other components of inventory system 10 on behalf of the device that physically houses drive module 120, docking actuator 130, and the other appropriate components of mobile drive unit 20. As a result, for the purposes of this description and the claims that follow, the term "mobile drive unit" includes software and/or hardware, such as agent processes, that provides the described functionality on behalf of mobile drive unit 20 but that may be located in physically distinct devices from the drive module 120, docking actuator 130, and/or the other components of mobile drive unit 20 described above.

While FIGS. 4 and 5 illustrate a particular embodiment of mobile drive unit 20 containing certain components and configured to operate in a particular manner, mobile drive unit 20 may represent any appropriate component and/or collection of components configured to transport and/or facilitate the transport of inventory holders 30. As another example, mobile drive unit 20 may represent part of an overhead crane system in which one or more crane assemblies are capable of moving within a network of wires or rails to a position suitable to dock with a particular inventory holder 30. After docking with inventory holder 30, the crane assembly may then lift inventory holder 30 and move inventory to another location for purposes of completing an assigned task.

Furthermore, in particular embodiments, mobile drive unit 20 may represent all or a portion of inventory holder 30. Inventory holder 30 may include motorized wheels or any other components suitable to allow inventory holder 30 to propel itself. As one specific example, a portion of inventory holder 30 may be responsive to magnetic fields. Inventory system 10 may be able to generate one or more controlled magnetic fields capable of propelling, maneuvering and/or otherwise controlling the position of inventory holder 30 as a result of the responsive portion of inventory holder 30. In such embodiments, mobile drive unit 20 may represent the responsive portion of inventory holder 30 and/or the components of inventory system 10 responsible for generating and controlling these magnetic fields. While this description provides several specific examples, mobile drive unit 20 may, in general, represent any appropriate component and/or collection of components configured to transport and/or facilitate the transport of inventory holders 30.

Figure 6:
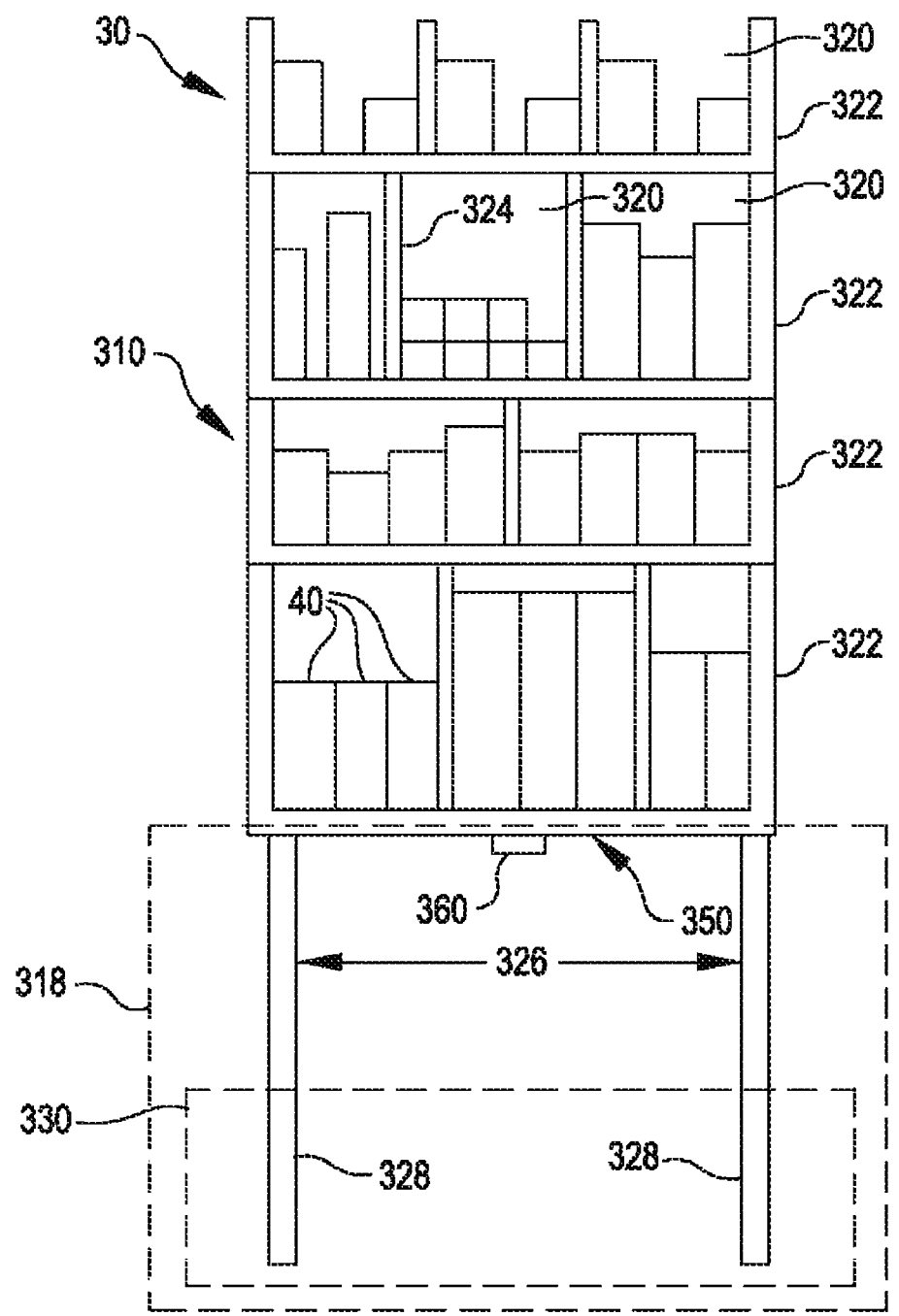
FIG. 6 illustrates in greater detail an example inventory holder that may be utilized in particular embodiments of the inventory system shown in FIG. 2.

FIG. 6 illustrates in greater detail the components of a particular embodiment of inventory holder 30. In particular, FIG. 6 illustrates the structure and contents of one side of an example inventory holder 30. In a particular embodiment, inventory holder 30 may comprise any number of faces with similar or different structure. As illustrated, inventory holder 30 includes a frame 310, a plurality of legs 328, and a docking surface 350.

Frame 310 holds inventory items 40. Frame 310 provides storage space for storing inventory items 40 external or internal to frame 310. The storage space provided by frame 310 may be divided into a plurality of inventory bins 320, each capable of holding inventory items 40. Inventory bins 320 may include any appropriate storage elements, such as bins, compartments, or hooks.

In a particular embodiment, frame 310 is composed of a plurality of trays 322 stacked upon one another and attached to or stacked on a base 318. In such an embodiment, inventory bins 320 may be formed by a plurality of adjustable dividers 324 that may be moved to resize one or more inventory bins 320. In alternative embodiments, frame 310 may represent a single inventory bin 320 that includes a single tray 322 and no adjustable dividers 324. Additionally, in particular embodiments, frame 310 may represent a load-bearing surface mounted on mobility element 330. Inventory items 40 may be stored on such an inventory holder 30 by being placed on frame 310. In general, frame 310 may include internal and/or external storage space divided into any appropriate number of inventory bins 320 in any appropriate manner.

Additionally, in a particular embodiment, frame 310 may include a plurality of device openings 326 that allow mobile drive unit 20 to position docking head 110 adjacent docking surface 350. The size, shape, and placement of device openings 326 may be determined based on the size, the shape, and other characteristics of the particular embodiment of mobile drive unit 20 and/or inventory holder 30 utilized by inventory system 10. For example, in the illustrated embodiment, frame 310 includes four legs 328 that form device openings 326 and allow mobile drive unit 20 to position mobile drive unit 20 under frame 310 and adjacent to docking surface 350. The length of legs 328 may be determined based on a height of mobile drive unit 20.

Docking surface 350 comprises a portion of inventory holder 30 that couples to, abuts, and/or rests upon a portion of docking head 110, when mobile drive unit 20 is docked to inventory holder 30. Additionally, docking surface 350 supports a portion or all of the weight of inventory holder 30 while inventory holder 30 is docked with mobile drive unit 20. The composition, shape, and/or texture of docking surface 350 may be designed to facilitate maneuvering of inventory holder 30 by mobile drive unit 20. For example, as noted above, in particular embodiments, docking surface 350 may comprise a high-friction portion. When mobile drive unit 20 and inventory holder 30 are docked, frictional forces induced between docking head 110 and this high-friction portion may allow mobile drive unit 20 to maneuver inventory holder 30. Additionally, in particular embodiments, docking surface 350 may include appropriate components suitable to receive a portion of docking head 110, couple inventory holder 30 to mobile drive unit 20, and/or facilitate control of inventory holder 30 by mobile drive unit 20.

Holder identifier 360 marks a predetermined portion of inventory holder 30 and mobile drive unit 20 may use holder identifier 360 to align with inventory holder 30 during docking and/or to determine the location of inventory holder 30. More specifically, in particular embodiments, mobile drive unit 20 may be equipped with components, such as holder sensor 150, that can detect holder identifier 360 and determine its location relative to mobile drive unit 20. As a result, mobile drive unit 20 may be able to determine the location of inventory holder 30 as a whole. For example, in particular embodiments, holder identifier 360 may represent a reflective marker that is positioned at a predetermined location on inventory holder 30 and that holder sensor 150 can optically detect using an appropriately-configured camera.

Depending on the configuration and characteristics of mobile drive unit 20 and inventory system 10, mobile drive unit 20 may move inventory holder 30 using a variety of appropriate methods. In a particular embodiment, mobile drive unit 20 is capable of moving inventory holder 30 along a two-dimensional grid, combining movement along straight-line segments with ninety-degree rotations and arcing paths to transport inventory holder 30 from the first location to the second location. Additionally, while moving, mobile drive unit 20 may use fixed objects located in the workspace as reference points to assist in navigation. For example, in particular embodiments, inventory system 10 includes multiple fiducial marks. Mobile drive unit 20 may be configured to detect fiducial marks and to determine the location of mobile drive unit 20 and/or measure its movement based on the detection of fiducial marks.

After mobile drive unit 20 arrives at the second location, mobile drive unit 20 may perform appropriate operations to facilitate access to inventory items 40 stored in inventory holder 30. For example, mobile drive unit 20 may rotate inventory holder 30 to present a particular face of inventory holder 30 to an operator of inventory system 10 or other suitable party, such as a packer selecting inventory items 40 from inventory holder 30. Mobile drive unit 20 may also undock from inventory holder 30. Alternatively, instead of undocking at the second location, mobile drive unit 20 may transport inventory holder 30 back to the first location or to a third location after any appropriate actions have been taken involving inventory items 40. For example, after a packer has removed particular inventory items 40 from inventory holder 30, mobile drive unit 20 may return inventory holder 30 to its original storage location, anew storage location, or another inventory station. Mobile drive unit 20 may then undock from inventory holder 30 at this new location.

Figure 7:
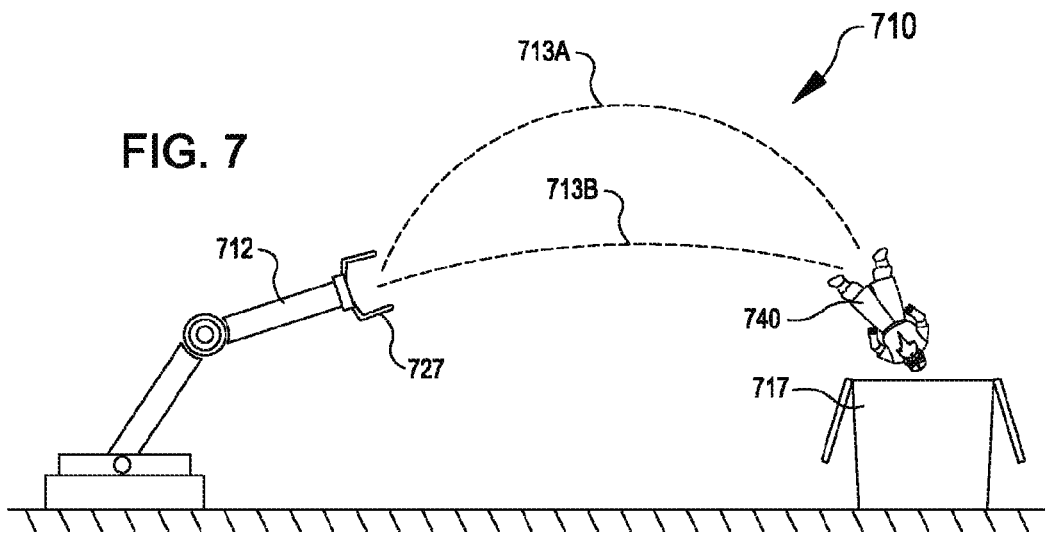
FIG. 7 illustrates a robotic arm capable of tossing an inventory item along multiple trajectories to a receiving location according to various embodiments.

As described above, embodiments herein are directed to tossing inventory items using robotic arms or manipulators within an inventory system. FIG. 7 illustrates an example inventory system 710 having a robotic arm 712 capable of tossing an item 740 along multiple trajectories 713 (individually referenced as 713A and 713B in FIG. 7) to move an item 740 from the robotic arm 712 to a receiving location 717. In FIG. 7, the receiving location 717 is shown as a standardized container that is reusable within the inventory system 700, but other structure may additionally or alternatively be utilized in association with the receiving location 717, in embodiments, the robotic arm 712 can achieve the different trajectories 713A, 713B by changing tossing strategies or operating according to different tossing strategies. Among other characteristics, the tossing strategies may vary according to initial velocity, initial position, and/or initial orientation introduced to the inventory items 740 when released by the robotic arm 712.

The robotic arm 712 can utilize any suitable end effector 727 (or combination of end effectors 727) to engage the item 740 to facilitate tossing the item 740. Examples of suitable end effectors 727 include, but are not limited to, soft robotic effectors, vacuum effectors, electro-adhesion effectors, and mechanical or electromechanical effectors. Soft robotic end effectors may generally include flexible structures that may be manipulated between various orientations. The structures may include silicon bodies or other flexible material. Manipulation of the flexible material may be achieved through use of flexible actuators such as air muscles (e.g., contractile or extensional devices operated by pressurized air movement relative to filling or emptying a pneumatic bladder), electro-active polymers e.g., polymers which change size or shape when stimulated by an electric field), or ferrofluids (e.g., fluids having suspended ferro-magnetic particles capable of altering a size or shape of the fluid volume when subjected to a magnetic field). Vacuum end effectors may grasp items using suction. Electro-adhesion end effectors can include an array of electrodes arranged along a flexible or rigid substrate capable of applying a charge (akin to static electricity) that can adhere an item to the substrate portions that are in contact with the item. Mechanical or electromechanical end effectors may include pinchers, claws, grippers, or other rigid components that may be actuated relative to one another for grasping an item. Other end effectors may also be utilized to facilitate additional grasping and/or tossing techniques. For example, a magnetic or electromagnetic end effector may be useful for grasping items having ferro-magnetic materials. As another example, an end effector may include a platform or other structure that can be placed underneath an item (e.g., by scooping the item or as a result of the item dropping onto the platform) so as to grasp the item by supporting the item from underneath.

In some aspects, the robotic arm 712 may alter a trajectory 713 or provide a different trajectory 713 based on an end effector 727 utilized by the robotic arm 712. The end effector 727 used by the robotic arm. 712 may have an effect on different operations associated with the toss. For example, the end effector 727 may affect how the item 740 is grasped for the toss. Grasping may include any physical manipulation of objects, including, but not limited to, picking up, pushing, pulling, compressing, stretching, supporting, and moving.

The end effector 727 may also affect how the arm 712 moves while grasping the item 740 to impart motion for the toss. For example, an end effector with a platform that supports the item 740 from beneath may limit the robotic arm 712 to certain motions that resemble catapulting or overhand throwing, while an end effector with a mechanical pincher may be able to clutch the item 740 in a manner that is sufficiently secure to permit other operations, such as motions that resemble underhand throwing or other wind-up motions.

The end effector may also affect how the item 740 is ultimately released or separates from the robotic arm 712 to initiate or begin the trajectory 713. For example, an end effector with a mechanical pincher may open the pincher to release the tossed item 740 at a particular release point during movement of the robotic arm 712 to provide the tossed item 740 with a particular initial position and initial velocity for achieving the intended trajectory 713. As another example, an item 740 moved by an end effector 727 with a platform that supports the item 740 from beneath may separate from the end effector 727 and start a trajectory as a result of motion of the robotic arm 712, such as a sudden stop of the robotic arm 712, rather than an active releasing operation of the end effector 727. In some aspects, the end effector may provide additional forces or effects for changing or affecting a starting state of the item 740 being tossed. For example, a vacuum end effector may reverse suction so as to provide a propelling effect to the tossed item 740 at the start of the trajectory 713.

Figure 8:
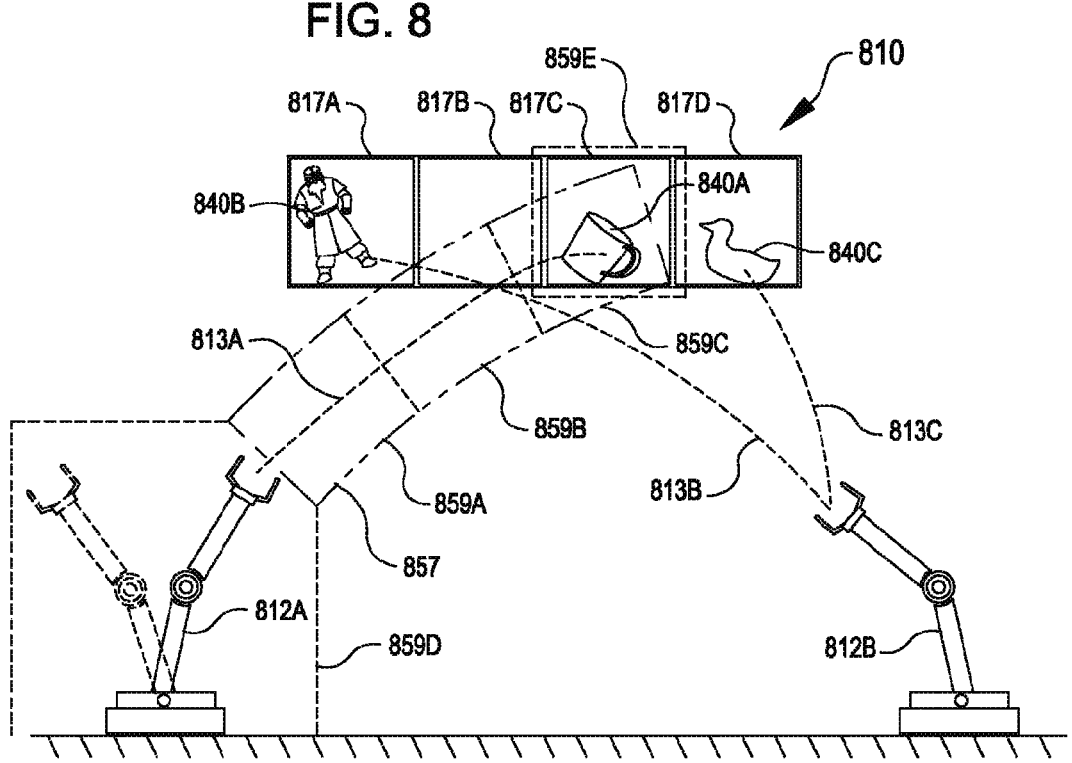
FIG. 8 illustrates an example of operation of a reservation system for managing tossing by multiple robotic arms according to various embodiments.

FIG. 8 illustrates an example of an inventory system 810 utilizing multiple robotic arms 812 (individually identified in FIG. 8 as a first robotic arm 812A and second robotic arm 812B). The multiple robotic arms 812 can toss items into a set of receiving locations 817. The set may include any suitable number, including one or more than one. Any particular receiving location 817 may be situated to receive items 840 from any number of robotic arms 812, and robotic arms 812 may be capable of tossing items 840 to any number of receiving locations 817. For example, the system 810 illustrated in FIG. 8 includes four receiving locations 817A-817D that can each receive inventory items 40 tossed by either of the robotic arms 812A, 812B. However, in other embodiments, an individual robotic arm 812 may be capable of tossing items 40 into a subset of the receiving locations 817. As may be appreciated, the system 810 can include any ratio of robotic arms 812 to receiving locations 817. For example, although two robotic arms 812 are shown with respect to four receiving locations 817, the system 810 could alternatively have more robotic arms 812 than receiving locations 817, more receiving locations 817 than robotic arms 812, or an even amount of robotic arms 812 and receiving locations 817. In some embodiments, utilizing multiple robotic arms 812 can reduce a number of failure points available in the system 810 and/or eliminate or reduce an amount of other conveyance mechanisms that might otherwise be utilized for movement of items within the system.

The system 810 can be operated so as to reduce a risk that different tossing operations of different robotic arms 812 may interfere with one another. For example, a tossing strategy can be determined for using the first robotic arm 812A to toss a first inventory item 840A (in the illustrated example, a mug 840A) along a first trajectory 813A into a third receiving location 817C. A reservation 857 can be generated corresponding to a space and time of the trajectory 813A. The reservation 857 may correspond to different segments 859A, 859B, 859C, 859D, 859E (collectively 859) corresponding to different physical spaces and/or times (or ranges thereof) associated with the trajectory 813A. For example, the segments 859A, 859B, 859C may correspond to space ranges or volumes occupied by the tossed first inventory item 840A at different times during the first trajectory 813A. In some embodiments, the segments 859 can correspond to volumes of space that are larger than a volume occupied by a tossed item 840 by a specified margin of error. For example, if an item has a volume corresponding to a cube with sides of 10 cm, the segment 859 reserved for the item may include a volume of a cube with sides of 30 cm, such that a 10 cm buffer is provided around the volume of the tossed item 40. In some aspects, a reservation 857 may additionally or alternatively include one or more segments 859D that correspond to a space and/or time in which a robotic arm 812 is to move for imparting motion to generate the trajectory 813 for the tossed item 40. Additionally or alternatively, the reservation 857 may include one or more segments 859E that correspond to a space and/or time in which a receiving location 817C is to be manipulated for receiving the tossed item 840A. Some examples of such manipulation are described in greater detail herein with respect to FIG. 10.

The robotic arms 812 can be operated so as to avoid reservations 857 of other robotic arms 812 or trajectories 813. As an illustrative example, the second robotic arm 812B may be tasked with tossing a dwarf 840B (i.e., a second item 840B) to a first receiving location 817A. The first receiving location 817A may be located such that a trajectory 813B of the tossed dwarf 840B would cross the trajectory 813A of the mug 840A. To avoid a conflict, a tossing strategy for the second robotic arm 812B may be developed so that a trajectory 813B of the dwarf 840B avoids the space corresponding to the segments 859B and 859C of the reservation 857 of the first robotic arm 812A. For example, the tossing strategy may be developed for the second robotic arm 812B such that the trajectory 813B provided by the second robotic arm 812B for the dwarf 840B passes over the space corresponding to the segments 859 of the reservation 857. Alternatively, the second robotic arm 812 may toss so that the trajectory 813E of the dwarf 840B passes under the space corresponding to the reservation 857. As another alternative, the second robotic arm 812B may toss the dwarf 840B along a trajectory 813B that passes through the space of the reservation 857 at a time outside of a time range associated with the reservation for the first robotic arm 812A. In some aspects, the second robotic arm 812B may alternatively select another item, such as the rubber ducky (third item 840C) that can be tossed to a designated fourth receiving location 817D along a third trajectory 813C that does not cross the reservation 857 of the first trajectory 813A of the first robotic arm 812A.

Figure 9:
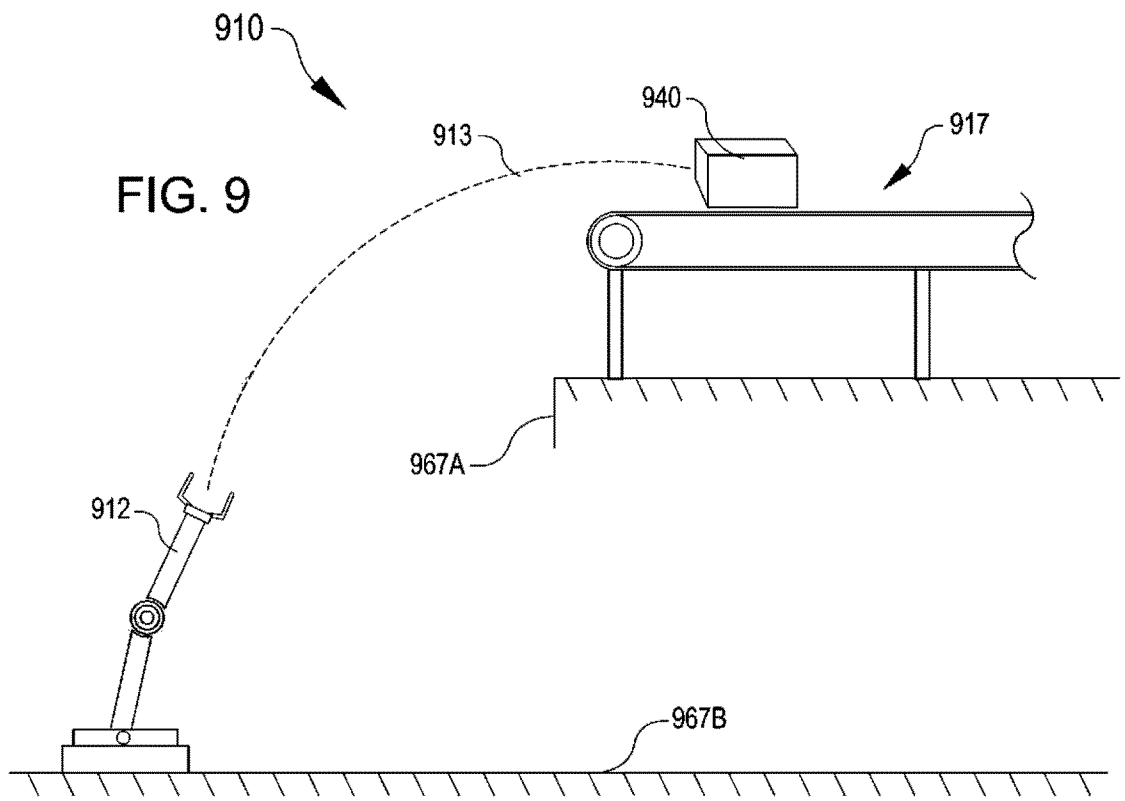
FIG. 9 illustrates an example of a trajectory of an item tossed by a robotic arm to a floor or level above the robotic arm according to various embodiments.

In some embodiments, robotic arms can be used to toss items to receiving locations that are located above or below the robotic arm. For example, FIG. 9 illustrates an example system 910 in which a robotic arm 912 is used to toss an item 940 along a trajectory 913 to a receiving location 917 (shown as a conveyor belt in FIG. 9) located on a floor 967A that is positioned above a floor 967B on which the robotic arm. 912 is located.

Figure 10:
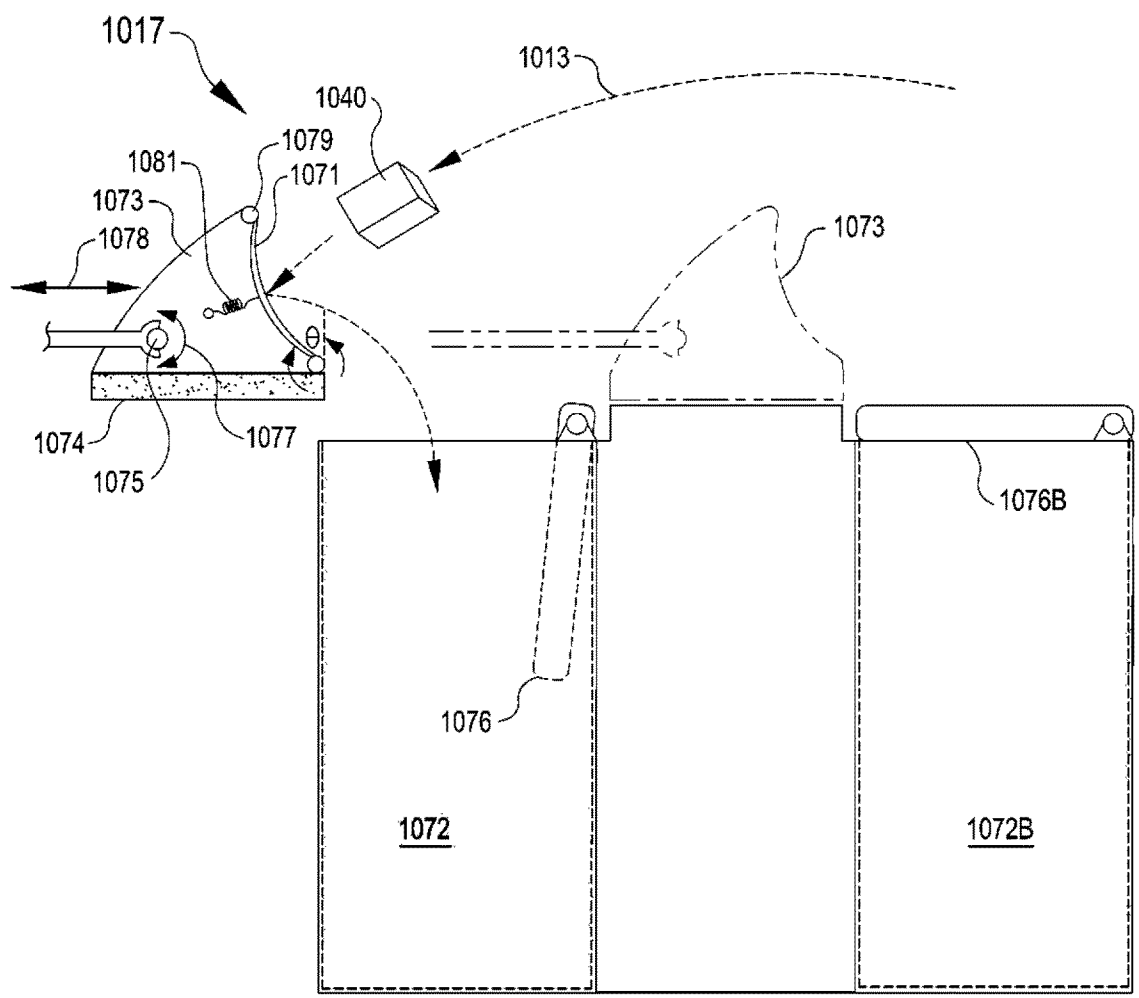
FIG. 10 illustrates an example of features that can be utilized at a receiving location according to various examples.
Figure 11:
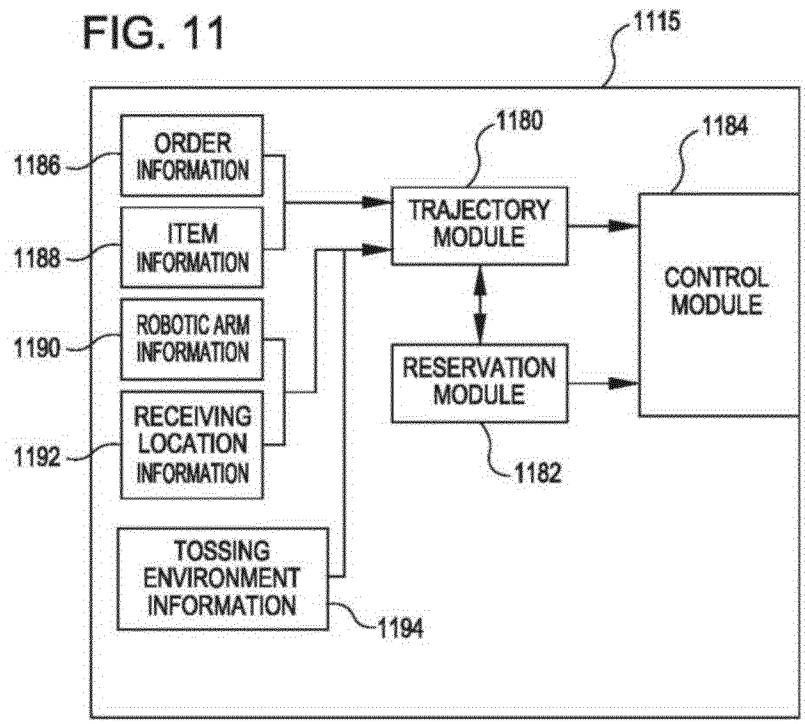
Figure 12:
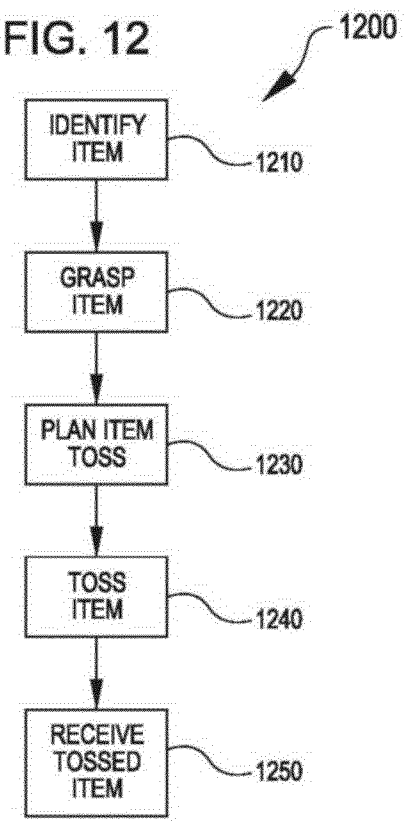
Figure 13:
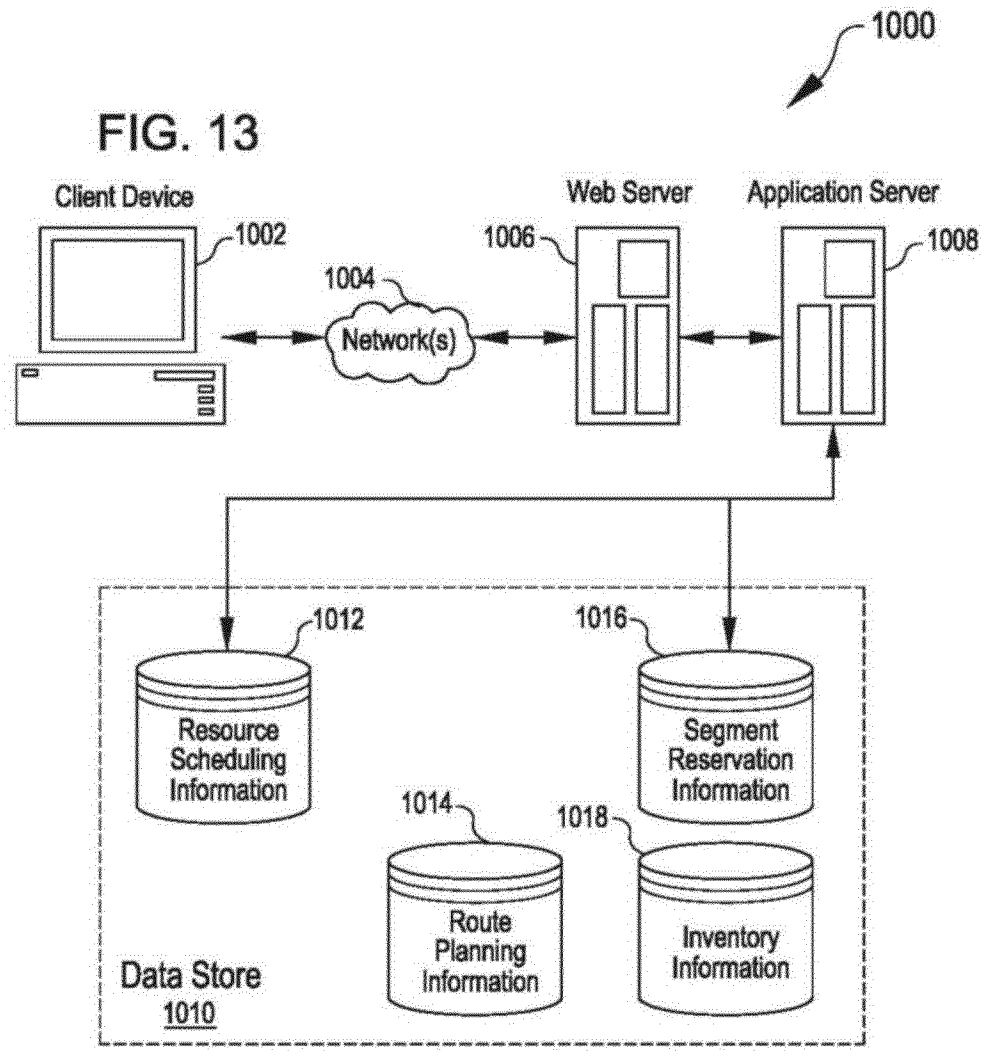

FIG. 10 illustrates a receiving location 1017 with features that can be manipulated for receiving inventory items 1040 that are tossed. For example, the receiving location 1017 can include suitable structure for directing a tossed item 1040 into a chute 1072 or other suitable receiving structure. In various embodiments, the receiving location 1017 can be manipulated to vary characteristics of the receiving location 1017 in response to information about the tossed inventory item 1040 and/or a trajectory 1013 of the tossed inventory item 1040. For example, manipulation can include changing and/or moving features of the receiving location 1017.

In some embodiments, a surface 1071 can be positioned to receive a tossed item 1040. Characteristics of the surface 1071 can be adjusted, for example, to produce or reduce forces acting on the received item 1040. For example, the surface 1071 may be adjusted to absorb force and reduce a risk of bouncing or intensity of bouncing of the tossed item 1040, and/or the surface 1071 may be adjusted to increase forces that are likely to cause the received item to slide to a desired location, rather than sticking.

The surface 1071 may be manipulated, for example, by changing an angle θ of the surface. The angle θ is shown in FIG. 10 as a deviation from a vertical plane, but may alternatively correspond to a deviation from any other suitable reference. Any suitable structure for modifying the angle θ of the surface 1071 may be utilized. In the embodiment illustrated in FIG. 10, the angle of the surface 1071 can be adjusted by rotating a body 1073 having the surface 1071 about a pivot 1075, such as shown by arrow 1077. For example, decreasing the angle θ (e.g., rotating the surface 1071 clockwise in FIG. 10) may increase a likelihood that a tossed item 40 with a high-friction surface characteristic will slide down the surface toward the chute 1072

In some embodiments, the surface 1071 can be changed in resilience. For example, the surface 1071 may correspond to a fabric or mesh surface that can be made more or less taut, such as by controlling operation of spools 1079 or a spring 1081. In some embodiments, a biasing mechanism, such as the spring 1081, can provide a shock-absorbing effect, e.g., to reduce momentum or otherwise absorb forces acting on the tossed item 1040. In some scenarios, a stiffness of the spring 1081 or other biasing mechanism can be variable, e.g., allowing an amount of shock-absorption to be controlled through automation in response to information about the tossed item 1040 and/or the trajectory 1013 of the tossed item 1040. In some examples, changing a resilience may decrease a risk that a tossed item 40 with a bouncy surface characteristic will bounce over or away from the chute 1072.

In some aspects, a material of the surface 10711 may be changed. For example, the body 1073 can be rotated so that a foam surface 1074 can be rotated and positioned in the path of the trajectory 1013 of the tossed item 1040. Any other suitable mechanism for substituting and/or modifying a characteristic of the surface 1071 may additionally or alternatively be used. Non-limiting examples include manipulating the receiving location 1017 (such as substituting or changing the material of the surface 1071) to change surface characteristics such as friction, electrical conductivity, resilience, magnetism, etc.

In various embodiments, the receiving location 10117 can include appropriate structures for moving the received item 1040 to an appropriate location within the receiving location 101'7. For example, as illustrated in FIG. 10, the body 1073 may be moved to push the received item across the top of a first chute 1072 when an associated first trap door 1076 is closed. Such an action may move the item 1040 over a second chute 1072B (e.g., moving from the position of the body 1073 shown in solid line at the left of FIG. 10 to the position shown in phantom line in the middle of FIG. 10). This may move the item 1040 to a position from which item 1040 can be dropped into the second chute 1072B upon actuation of the trap door 1076B, or move the item 1040 directly into the second chute 1072B if the second trap door 1076B is already open or not present. The movement (e.g., translation) of the body 1073 may be provided by any suitable actuation, for example, shown at 1078 as a double-headed arrow 1078 illustrating lateral translation of the body 1073. Although various features are illustrated for manipulating the receiving location 1017 to accommodate a specific tossed item 1040, other combinations or types of features can alternatively or additionally be used, including simpler or more complex structures that include different types and/or numbers of features than illustrated in FIG. 10. Additionally, although the body 1073 is illustrated as a separate component from the chute 1072, movable or adjustable surfaces in other embodiments may form a portion of the chute 1072 or other structure of the receiving location 1017.

Figure 11:
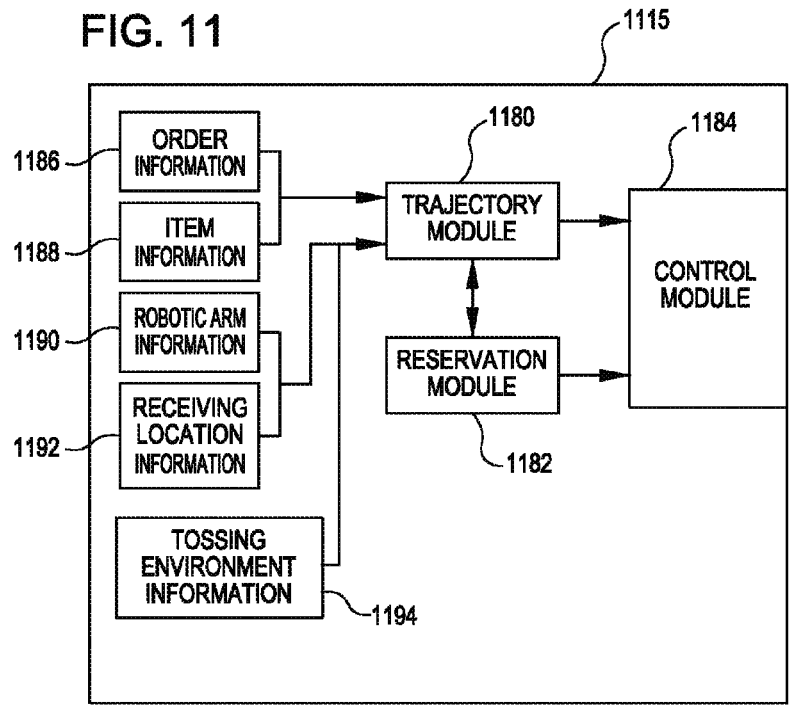
FIG. 11 illustrates in greater detail additional components that can be utilized inventory systems herein according to various embodiments.

FIG. 11 illustrates in greater detail additional components that can be utilized in inventory systems herein according to various embodiments. FIG. 11 illustrates a management module 1115, which may be an example of the management module shown in FIG. 3 and/or the controller 32 shown in FIG. 1. The management module 1115 includes a trajectory module 1180, a reservation module 1182, and a control module 1184. Example modules are shown in FIG. 11, but functions and embodiments described herein can utilize a subset of the features provided by the modules and/or additional functions can be provided. Additionally, while the example modules are here briefly discussed with regard to FIG. 11, further specific details regarding the example modules may be appreciated with respect to the descriptions of other Figures herein.

The trajectory module 1180 can utilize information to determine an appropriate trajectory and/or tossing strategy for moving an inventory item to a receiving location via a robotic arm. The reservation module 1182 can reserve segments for trajectories of items, for associated motions of robotic arms, and/or for associated manipulations of receiving locations, for example, based on tossing strategies generated for robotic arms by the trajectory module 1180. In some aspects, the reservation module 1182 may evaluate different tossing strategies or trajectories from the trajectory module 1180 and generate reservations or otherwise select, prioritize, or organize tossing strategies so as to optimize tossing operations in the workspace. For example, the reservation module 1182 may select a set and/or sequence of tossing strategies for a set of robotic arms based on a determination that the selected tossing strategies can be performed together and will not interfere with one another. In this way, the reservation module 1182 may ensure that an initial tossing strategy selected for one robotic arm will not unduly limit tossing strategy options for another robotic arm. The control module 1184 can generate instructions for controlling the robotic arm, for example, based on information from the trajectory module 1180 and/or the reservation module 1182. For example, the control module 1184 may receive a trajectory from the trajectory module 1180 and determine whether or not to control the robotic arm to impart that trajectory to an item based on whether that trajectory or motions for imparting that trajectory or receiving that trajectory would interfere with reserved segments specified by the reservation module. The control module 1184 can additionally or alternatively generate instructions for controlling features of the receiving location, for example, based on information from the trajectory module 1180 and/or the reservation module 1182. For example, the control module 1184 may receive a trajectory from the trajectory module 1180 and determine an appropriate responsive manipulation of the receiving location for receiving the tossed item in a way that directs the tossed item in a desirable way and/or that avoids manipulations of the receiving location that may conflict with reserved segments specified by the reservation module.

The trajectory module 1180 can utilize information from any suitable source to determine a trajectory for a tossed item. For example, the trajectory module 1180 may use order information 1186, item information 1188, robotic arm information 1190, receiving location information 1192, and/or tossing environment information 1194. Order information 1186 may include information about an ordered item, such as information about a location of a requested item within a work space, a designated destination for that item, and/or a designated timeframe for completing an order for the item. Such information may be used for example to determine which of multiple robotic arms and/or receiving locations can be used to fulfill the order for the item.

Item information 1188 may include information about the item, such as information about characteristics of the item. The item information 1188 can be obtained from any relevant source, including from sensors (e.g., the sensor package 16 of FIG. 1) or from stored information about the item (e.g., the item database 37 of FIG. 1). Relevant characteristics about the item may include mass, weight, density, geometric characteristics (e.g., size, shape, dimensions, volume, position, or orientation), electrical conductivity, magnetic properties, surface characteristics (e.g., how slippery or porous the item is, or a measure of friction, air resistance, or other resistance), deformability, structural integrity, resilience, fragility, electrical resistance, magnetism, temperature, etc. The variability, or ability of an item to change any characteristic, may also be a relevant characteristic. For example, variability may provide an indication of an ability of the item to change shape (e.g., if a book has a dust cover that may have a risk of separating from the book during a toss), change mass distribution (e.g., if an item has objects within packaging that can move relative to the packaging such that the center mass of the item may move during flight or tossing), or change other characteristics.

The robotic arm information 1190 may include information about the robotic arm to be used for a toss. For example, this may include information about available end effectors, available degrees of freedom of motion of the robotic arm, kinds of motion that can be executed or achieved by the robotic arm, ranges of motion available with the robotic arm, velocity that the robotic arm can attain and/or impart on items, space occupied by the robotic arm when performing particular movements, or any other capabilities and/or constraints of the robotic arm.

The receiving location information 1192 can include information about the receiving location for a particular toss. For example, this may include an indication of availability of receiving locations for the toss, horizontal or other distances to the receiving location, and/or information about how the receiving location can be or is to be varied (e.g., including, but not limited to, changes discussed with respect to FIG. 10).

The tossing environment information 1194 can include information about the environment through which the trajectory of the tossed item is to pass. For example, this information may include information about conditions within the workspace that may otherwise interfere with or affect a trajectory of a tossed item. Non-limiting examples of such conditions include temperature, air currents, or physical obstacles (e.g., fixed obstacles such as walls, floors, ceilings, etc. or movable obstacles such as inventory holders, robotic manipulators, human operators, etc.).

Figure 12:
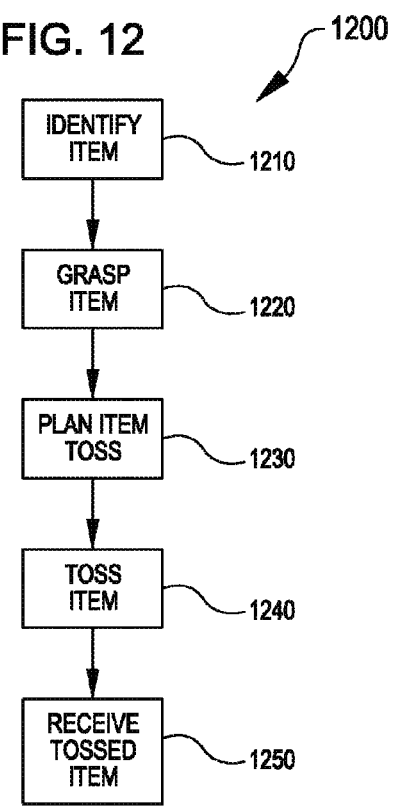
FIG. 12 is a flowchart illustrating an example of a process that may be performed for managing tossing of inventory items in an inventory system according to certain embodiments.

FIG. 12 illustrates an example of a process 1200 that can be performed to coordinate tossing of items. Some or all of the process 1200 (or any other processes described herein, or variations and/or combinations thereof) may be performed under the control of one or more computer systems configured with executable instructions, such as the modules described herein (e.g., those discussed with respect to the management module 1115 of FIG. 11), and may be implemented as code (e.g., executable instructions, one or more computer programs or one or more applications) executing collectively on one or more processors, by hardware or combinations thereof. The code may be stored on a computer-readable storage medium, for example, in the form of a computer program including a plurality of instructions executable by one or more processors. The computer-readable storage medium may be non-transitory. Moreover, unless indicated otherwise, acts shown in the processes are not necessary performed in the order shown, and/or some acts can be omitted in embodiments.

The process 1200 at 1210 can include identifying an item. For example, the item may be identified based on sensor information (e.g., from the sensor package 16 described in FIG. 1) and/or based on information stored about the item (e.g., in the item database 37 in FIG. 1). This may include identifying a set of characteristics (which may include one or more characteristics) of the item that may be useful in planning and/or executing oboes of the item.

In some aspects, identifying the item at 1210 may include identifying whether the item is deemed tossable or not. For example, if an item is determined to be too fragile for tossing, the item may be sidetracked or otherwise diverted for moving through the inventory system in another manner that does not include tossing the item or that includes tossing the item over shorter distances or with other less intense tosses. Additionally or alternatively, an item may be identified in which a tossing strategy has not been developed. For example, the item may be directed to another location so that a human operator or testing apparatus can be utilized to test and/or develop different item tossing strategies for the item until a suitable strategy is determined. As an example, the human operator may provide input about how the item may be effectively tossed by the robotic arm, such as by selecting from different options presented on a screen or by donning a glove or other garment and tossing the item so that a tossing strategy for the robotic arm may be generated using information from features on the glove (e.g., pressure sensors, tactile sensors, or fiducial markers used to track the motion of the glove with an optical imaging device).

The process 1200 at 1220 can include grasping the item. For example, the robotic arm may be instructed to grasp the item using any appropriate end effector from any appropriate orientation, or combination of end effectors and/or robotic arms. For example, the robotic arm may use information identified at 1210 about an orientation of the item to facilitate grasping the item.

The process 1200 at 1230 can include planning an item toss. For example, this may include the trajectory module 1180 of FIG. 11 accessing appropriate information (as shown and described with respect to FIG. 11) for planning a trajectory of the item. The planning of the item toss may also include making and/or checking appropriate reservations (e.g., via the reservation module 1182 of FIG. 11) for ensuring that that the item toss will not interfere with other item tosses. In some aspects, the planning of an item toss may include determining multiple trajectories and selecting a specific trajectory from those possible trajectories. For example, a trajectory may be selected based on an amount of energy expended by the robotic arm to cause the trajectory of the item. Additionally or alternatively, a trajectory may be selected based on the trajectory not interfering with reservations of other robotic throwing arms. In some aspects, the planned item toss may include how a robotic arm will grasp an item, move a grasped item, and a point or a time at which the robotic arm will release the item from its grasp so as to cause the item to follow an appropriate trajectory to a receiving location. In alternate embodiments, the robotic arm may be constrained to grasp an item in a particular manner, and a toss of the item may be planned or an item tossing strategy may be determined based on a way in which the robotic arm is constrained to grasp the item or has already grasped the item.

The process at 1200 at 1240 can include tossing the item. This can include operating, instructing, and/or controlling the robotic arm to grasp, move, and release the item according to the tossing strategy determined for the item.

The process 1200 at 1250 can include receiving the tossed item. For example, this may include receiving the item at a receiving location. In some aspects, receiving the tossed item includes manipulating the receiving location, such as to change characteristics of the receiving location (e.g., in manners described above with respect to FIG. 10, and/or based on instructions from the control module 1184). The receiving location may be manipulated based on information about the item and/or the trajectory of the item, such as a set of one or more characteristics about the item and/or the trajectory. Non-limiting examples of characteristics that may be included in such a set of characteristics include a velocity of the tossed item during the trajectory, a mass of the tossed item, a geometric characteristic of the tossed item, a surface characteristic of the tossed item, a deformability of the tossed item, a structural integrity of the tossed item, a variability of the tossed item, and/or other characteristics described herein. In some aspects, the receiving location can be manipulated based on either or both of information about a planned toss and/or sensed information about a toss that has been initiated. For example, in some scenarios, the sensor package 16 of FIG. 1 may include sensors that can capture information about the tossed item during a trajectory between the robotic arm and the receiving location.

Figure 13:
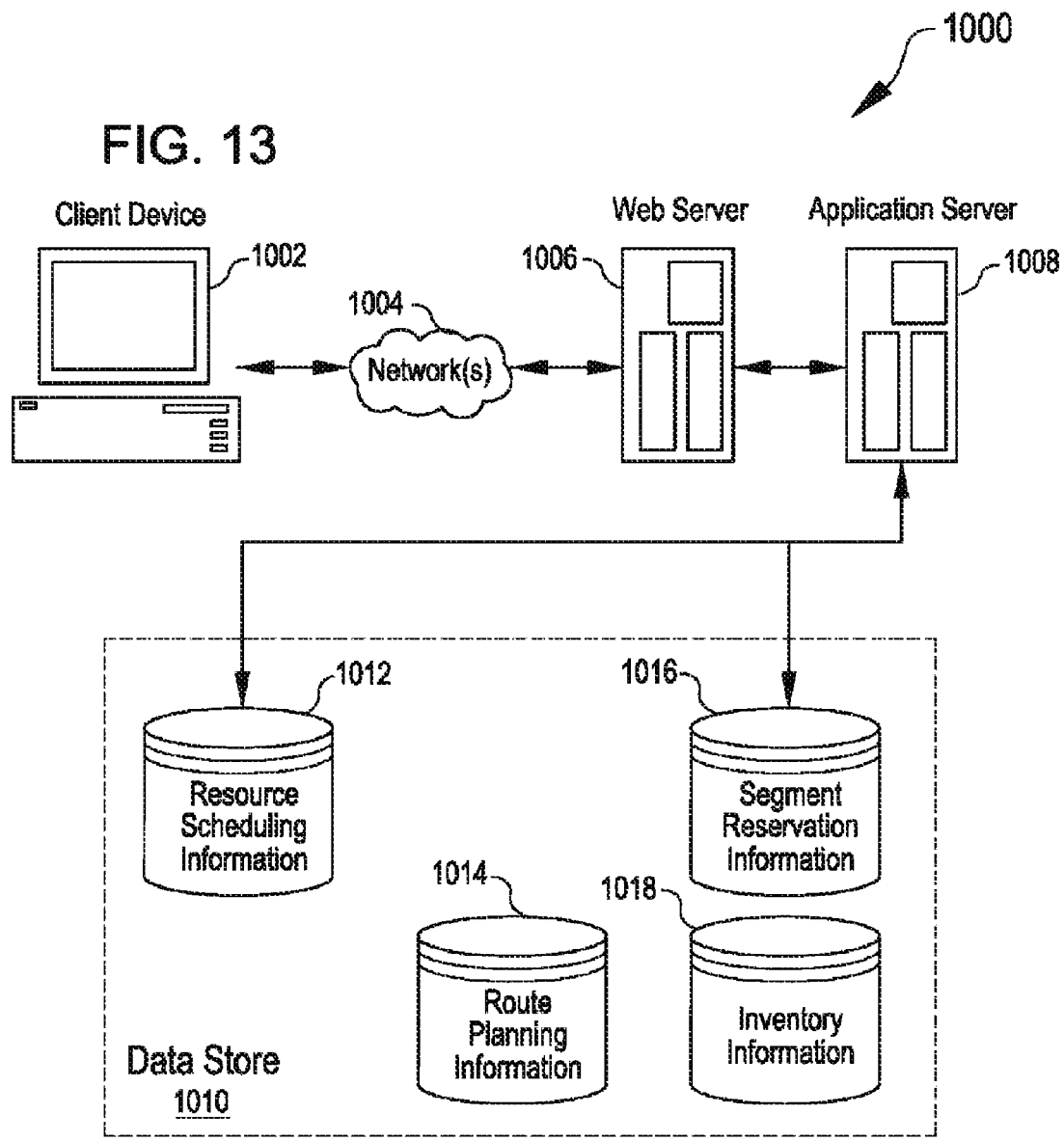
FIG. 13 illustrates an environment in which various features of the inventory system can be implemented, in accordance with at least one embodiment.

FIG. 13 illustrates aspects of an example environment 1000 for implementing aspects in accordance with various embodiments. As will be appreciated, although a Web-based environment is used for purposes of explanation, different environments may be used, as appropriate, to implement various embodiments. The environment includes an electronic client device 1002, which can include any appropriate device operable to send and receive requests, messages, or information over an appropriate network 1004 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1006 for receiving requests and serving content in response thereto, although for other networks an alternative device serving a similar purpose could be used as would be apparent to one of ordinary skill in the art.

The illustrative environment includes a least one application server 1008 and a data store 1010. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the client device 1002 and the application server 1008, can be handled by the Web server. It should be understood that the Web and application servers are not required and are merely example components, as structured code discussed herein can be executed on any appropriate device or host machine as discussed elsewhere herein.

The data store 1010 can include several separate data tables, databases or other data storage mechanisms and media for storing data relating to a particular aspect. For example, the data store illustrated includes mechanisms for storing information which can be used by modules described herein, such as resource scheduling information 1012, route planning information 1014, segment reservation information 1016, and/or inventory information 1018. It should be understood that there can be many other aspects that may need to be stored in the data store, such as for page image information and to access right information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 13. Thus, the depiction of the system 1000 in FIG. 13 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, and/or any combination thereof.

In embodiments utilizing a Web server, the Web seer can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Pert, Python or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based at least in part on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for the invention to be practiced otherwise than as specifically described herein. Accordingly, this invention includes all modifications and equivalents of the subject ma ter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

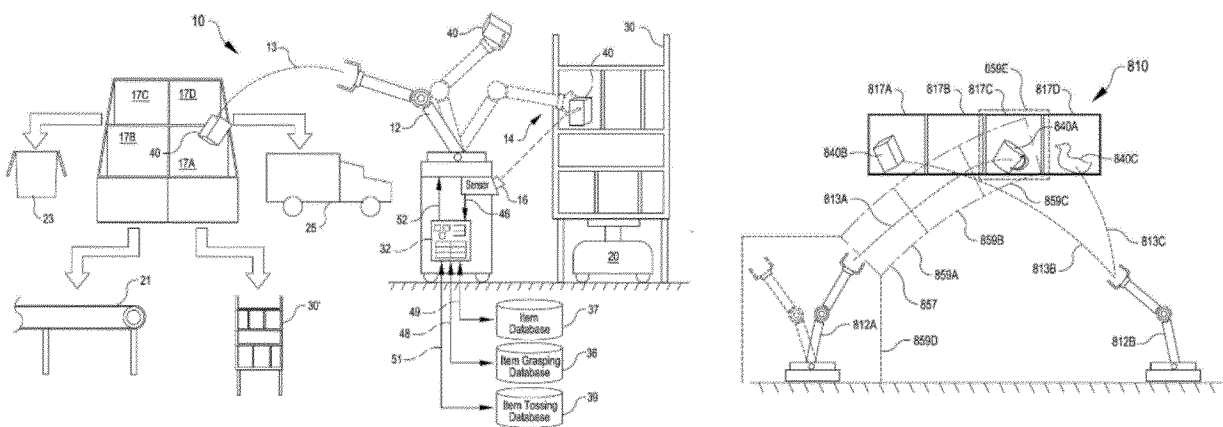

What is claimed is:

1. An inventory management system, comprising:
   a robotic manipulator configured to grasp any item of a plurality of items, the plurality of items including at least some items that differ from one another;
   one or more receiving locations; and
   a management module configured to:
      receive information about a particular item of the plurality of items;
      utilize the information to identify a set of characteristics of the particular item;
      determine, from among the one or more receiving locations, a designated receiving location designated for receiving the particular item, the designated receiving location having a known position relative to the robotic manipulator; and
      determine, based at least in part on the set of characteristics of the particular item and the known position of the designated receiving location, a tossing strategy for operating the robotic manipulator to move the particular item while grasped by the robotic manipulator to a release point and to release the particular item at the release point so as to cause the identified item to move along a trajectory from the release point to the known position of the designated receiving location, the trajectory having a vertical component and a horizontal component.

2. The inventory management system of claim 1, wherein the management module is further configured to:
   generate instructions to cause the robotic manipulator to grasp the particular item so that the particular item becomes a grasped particular item;
   generate instructions to cause the robotic manipulator to move the grasped particular item to the release point based on the tossing strategy; and
   generate instructions to cause the robotic manipulator to release the grasped particular item at the release point based on the tossing strategy.

3. The inventory management system of claim 1, wherein the management module is further configured to:
  determine a grasping strategy for grasping the particular item with the robotic manipulator so as to form a determined grasping strategy; and
  determine the tossing strategy based at least in part on the determined grasping strategy.

4. The inventory management system of claim 1, wherein the management module is further configured to:
  determine a grasping strategy for grasping the particular item with the robotic manipulator based on the tossing strategy.

5. The inventory management system of claim 1, wherein the set of characteristics includes at least one of:
  a mass of the particular item;
  a geometric characteristic of the particular item;
  a surface characteristic of the particular item;
  a deformability of the particular item;
  a structural integrity of the particular item;
  a variability of the particular item;
  a characteristic determined based on information received about the particular item from one or more sensors; or
  a characteristic determined based on stored information about the particular item.

6. The inventory management system of claim 1, wherein the management module is further configured to determine the tossing strategy based at least in part on one or more characteristics of the robotic manipulator that include at least one of:
  an end effector associated with the robotic manipulator;
  degrees of freedom of the robotic manipulator;
  types of motion possible with the robotic manipulator;
  a range of motion of the robotic manipulator;
  velocity attainable by the robotic manipulator; or
  space occupied by the robotic manipulator when performing particular movements.

7. An inventory management system, comprising:
  a first robotic manipulator configured for tossing items to at least one receiving location of a set of receiving locations comprising one or more receiving locations;
  a second robotic manipulator configured for tossing items to at least one receiving location of the set of receiving locations; and
  a management module configured to:
    determine a first trajectory of tossing a first item by the first robotic manipulator to a first receiving location in the set of receiving locations;
    generate a reservation including a space range associated with the first trajectory during a certain time range; and
    generate instructions to cause the second robotic manipulator to toss a second item to the first receiving location or to another receiving location in the set of receiving locations along a second trajectory that avoids the space range associated with the first trajectory during the certain time range of the reservation.

8. The inventory management system of claim 7, wherein the second trajectory includes at least one of:
  a path travelling over the space range associated with the first trajectory during the certain time range of the reservation;
  a path travelling under the space range associated with the first trajectory during the certain time range of the reservation; or
  a path travelling through the space range associated with the first trajectory during a time outside of the certain time range of the reservation.

9. The inventory management system of claim 7, wherein the management module is configured to determine the first trajectory based at least in part on information about a tossing environment in which the first item is to be tossed, the information about the tossing environment including at least one of:
  air currents present in the tossing environment; or
  physical obstacles present in the tossing environment.

10. The inventory management system of claim 7, wherein the space range associated with the first trajectory during the certain time range further includes a space range in which the first robotic manipulator moves to cause the first trajectory.

11. The inventory management system of claim 7, wherein the second trajectory includes a path that does not cross the space range associated with the first trajectory during the certain time range of the reservation.

12. The inventory management system of claim 7, wherein the space range associated with the first trajectory is based at least in part on a geometric characteristic of the first item.

13. The inventory management system of claim 7, wherein the management module is further configured to:
  receive information about the first item, wherein the first item is included in a plurality of items including at least some items that differ from one another;
  utilize the information to identify a set of characteristics of the first item;
  determine, from among the set of receiving locations, a designated receiving location designated for receiving the first item, the designated receiving location comprising the first receiving location and having a known position relative to the first robotic manipulator;
  determine, based at least in part on the set of characteristics of the first item and the known position of the first receiving location, a tossing strategy for operating the first robotic manipulator to move the first item while grasped by the first robotic manipulator to a release point and to release the first item at the release point so as to cause the first item to move along the first trajectory from the release point to the known position of the first receiving location, the first trajectory having a vertical component and a horizontal component; and
  generate instructions to cause the first robotic manipulator to toss the first item along the first trajectory;
  determine a second set of characteristics of at least one of the first item or the first trajectory; and
  generate instructions, based at least in part on the second set of characteristics, to manipulate the first receiving location for receiving the first item.

14. An inventory management system, comprising:
  a robotic manipulator configured for tossing any item of a plurality of items to a receiving location, the plurality of items including at least some items that differ from one another; and
  a management module configured to:
    generate instructions to cause the robotic manipulator to toss a particular item of the plurality of items along a trajectory toward the receiving location;
    determine a set of characteristics of at least one of the particular item or the trajectory; and generate instructions, based at least in part on the set of characteristics, to manipulate a structure at the receiving location to be configured for receiving the particular item.

15. The inventory management system of claim 14, wherein the instructions to manipulate the receiving location include instructions to change an angle of a surface of the receiving location that is in a path of the trajectory.

16. The inventory management system of claim 14, wherein the instructions to manipulate the receiving location include instructions to change a location of at least a portion of the receiving location that is in a path of the trajectory.

17. The inventory management system of claim 14, wherein the instructions to manipulate the receiving location include instructions to change a resilience of a portion of the receiving location that is in a path of the trajectory.

18. The inventory management system of claim 14, wherein the instructions to manipulate the receiving location include instructions to change a material of the receiving location that is in a path of the trajectory.

19. The inventory management system of claim 14, wherein the instructions to manipulate the receiving location include instructions to change a friction characteristic of a portion of the receiving location that is in a path of the trajectory.

20. The inventory management system of claim 14, wherein the set of characteristics includes at least one of:
    a velocity of the particular item during the trajectory;
    a mass of the particular item;
    a geometric characteristic of the particular item;
    a surface characteristic of the particular item;
    a deformability of the particular item;
    a temperature of the particular item;
    a temperature of a space associated with the trajectory;
    a structural integrity of the particular item; or
    a variability of the particular item.

* * * * *

UNITED STATES PATENT AND TRADEMARK OFFICE
CERTIFICATE OF CORRECTION

| | |
|---|---|
| PATENT NO. | : 10,023,393 B2 |
| APPLICATION NO. | : 14/869450 |
| DATED | : July 17, 2018 |
| INVENTOR(S) | : Jeremiah David Brazeau et al. |

It is certified that error appears in the above-identified patent and that said Letters Patent is hereby corrected as shown below:

On the Title Page

Delete the title page and substitute therefore with the attached title page consisting of the corrected illustrative figure(s).

In the Drawings

Please replace Figs. 1, 7, 8, 9, and 10 with Figs. 1, 7, 8, 9, and 10 as shown on the attached pages.

In the Specification

Column 1, Line 32:
Delete: "atm"
Insert: --arm--

Column 1, Line 59:
Delete: "can be utilized inventory systems"
Insert: --can be utilized in inventory systems--

Column 2, Line 59:
Delete: "and item tossing database"
Insert: --an item tossing database--

Column 4, Lines 40-41:
Delete: ", illustrated as a figurine of a dwarf 40,"

Column 4, Line 43:
Delete: "dwarf"
Insert: --item--

Signed and Sealed this
Twenty-first Day of April, 2020

Andrei Iancu
*Director of the United States Patent and Trademark Office*

Column 4, Line 47:
Delete: "dwarf"
Insert: --item--

Column 4, Line 48:
Delete: "dwarf"
Insert: --item--

Column 4, Line 51:
Delete: "dwarf"
Insert: --item--

Column 4, Line 54:
Delete: "dwarf"
Insert: --item--

Column 4, Line 57:
Delete "robotic arm. 12"
Insert: --robotic arm 12--

Column 4, Line 61:
Delete the first instance of: "dwarf"
Insert: --item--

Column 4, Line 61:
Delete the second instance of: "dwarf"
Insert: --item--

Column 4, Line 62:
Delete "overhand are executed"
Insert: --overhand arc executed--

Column 4, Line 63:
Delete: "dwarf"
Insert: --item--

Column 4, Line 64:
Delete: "dwarf"
Insert: --item--

Column 4, Line 65:
Delete: "dwarf"
Insert: --item--

Column 5, Line 12:
Delete: "inventory system is capable"

CERTIFICATE OF CORRECTION (continued)
U.S. Pat. No. 10,023,393 B2

Insert: --inventory system 10 is capable--

Column 9, Line 31:
Delete: "inventory system. 10 with"
Insert: --inventory system 10 with--

Column 9, Line 32:
Delete: "they axe interacting,"
Insert: --they are interacting,--

Column 19, Line 11:
Delete: "a dwarf"
Insert: --an item--

Column 19, Line 14:
Delete: "dwarf"
Insert: --second item--

Column 19, Line 17:
Delete: "dwarf"
Insert: --second item--

Column 19, Line 22:
Delete: "dwarf"
Insert: --second item--

Column 19, Line 25:
Delete: "dwarf"
Insert: --second item--

Column 19, Line 28:
Delete: "dwarf"
Insert: --second item--

Column 20, Line 27:
Delete: "surface 10711 may be"
Insert: --surface 1071 may be--

Column 20, Line 38:
Delete: "location 10117 can"
Insert: --location 1017 can--

Column 20, Line 41:
Delete: "101'7. For example,"
Insert: --1017. For example,--

Column 23, Line 12:
Delete: "executing oboes of the item."
Insert: --executing a toss of the item.--

Column 26, Line 23:
Delete: "the Web seer can"
Insert: --the Web server can--

(12) United States Patent
Brazeau et al.

(10) Patent No.: US 10,023,393 B2
(45) Date of Patent: Jul. 17, 2018

(54) ROBOTIC TOSSING OF ITEMS IN INVENTORY SYSTEM

(71) Applicant: Amazon Technologies, Inc., Seattle, WA (US)

(72) Inventors: Jeremiah David Brazeau, Hudson, NH (US); Andrew M. Sweeney, Franklin, MA (US); Henry David Garcia, Marlborough, MA (US); Fred Chen, Westborough, MA (US); Brian Michael Lusignan, Shrewsbury, MA (US)

(73) Assignee: Amazon Technologies, Inc., Seattle, WA (US)

( * ) Notice: Subject to any disclaimer, the term of this patent is extended or adjusted under 35 U.S.C. 154(b) by 338 days.

(21) Appl. No.: 14/869,450

(22) Filed: Sep. 29, 2015

(65) Prior Publication Data

US 2017/0088360 A1    Mar. 30, 2017

(51) Int. Cl.
| | |
|---|---|
| *G06F 7/00* | (2006.01) |
| *G06F 19/00* | (2018.01) |
| *B65G 31/00* | (2006.01) |
| *B25J 9/12* | (2006.01) |
| *B25J 9/16* | (2006.01) |
| *G06Q 10/08* | (2012.01) |
| *B65G 1/137* | (2006.01) |
| *G05B 19/418* | (2006.01) |

(52) U.S. Cl.
CPC ............ *B65G 31/00* (2013.01); *B25J 9/12* (2013.01); *B25J 9/1664* (2013.01); *B65G 1/1375* (2013.01); *G05B 19/41895* (2013.01); *G06Q 10/087* (2013.01); *G05D 2201/0216* (2013.01); *Y10S 901/02* (2013.01)

(58) Field of Classification Search
None
See application file for complete search history.

(56) References Cited

U.S. PATENT DOCUMENTS

| | | | |
|---|---|---|---|
| 7,854,669 B2 * | 12/2010 | Marty | A63B 24/0021 473/448 |
| 8,280,547 B2 | 10/2012 | D'Andrea et al. | |
| 9,087,314 B2 | 7/2015 | Hoffman et al. | |

(Continued)

OTHER PUBLICATIONS

Frank et al. "Throwing Objects a bio-inspired Approach for the Transportation of Parts", *Robotics and Biomimetics*. ROBIO '06 IEEE International Conference. (Dec. 1, 2006), pp. 91-96.

(Continued)

*Primary Examiner* — Yolanda R Cumbess
(74) *Attorney, Agent, or Firm* — Kilpatrick Townsend & Stockton LLP

(57) ABSTRACT

Robotic arms or manipulators can be used to toss inventory items within an inventory system. Tossing strategies for the robotic arms may include information about how a grasped item is to be moved and released by a robotic arm to achieve a trajectory for moving the item to a receiving location. A tossing strategy may also use a trajectory that avoids time and/or space reserved for a trajectory of another tossed item. The receiving location can include surfaces and/or other features that can be manipulated for receiving the item based on one or more characteristics of the tossed item and/or a trajectory of the tossed item.

20 Claims, 9 Drawing Sheets